US008681087B2

(12) United States Patent
Otoi et al.

(10) Patent No.: US 8,681,087 B2
(45) Date of Patent: Mar. 25, 2014

(54) IMAGE DISPLAY DEVICE AND IMAGE DISPLAY METHOD

(75) Inventors: Katsuya Otoi, Osaka (JP); Kohji Fujiwara, Osaka (JP); Katsuteru Hashimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 223 days.

(21) Appl. No.: 13/384,877

(22) PCT Filed: Mar. 26, 2010

(86) PCT No.: PCT/JP2010/055342
§ 371 (c)(1),
(2), (4) Date: Jan. 19, 2012

(87) PCT Pub. No.: WO2011/013402
PCT Pub. Date: Feb. 3, 2011

(65) Prior Publication Data
US 2012/0176419 A1  Jul. 12, 2012

(30) Foreign Application Priority Data

Jul. 30, 2009 (JP) ................................. 2009-177720

(51) Int. Cl.
*G09G 3/36* (2006.01)
(52) U.S. Cl.
USPC ........................... 345/102; 345/690; 362/97.3
(58) Field of Classification Search
USPC .................... 345/102, 204, 690; 313/498; 362/97.1–97.3; 349/69, 70
See application file for complete search history.

(56) References Cited

U.S. PATENT DOCUMENTS 8,531,385 B2 * 9/2013 Kim et al. ..................... 345/102
(Continued)

FOREIGN PATENT DOCUMENTS

| JP | 2005258403 A | 9/2005 |
| JP | 2007183499 A | 7/2007 |
| WO | WO-2008056306 A1 | 5/2008 |

OTHER PUBLICATIONS

International Search Report and Written Opinion of Searching Authority, Mar. 2010.

*Primary Examiner* — Tom Sheng
(74) *Attorney, Agent, or Firm* — Harness, Dickey & Pierce, P.L.C.

(57) ABSTRACT

An image display device which performs area-active drive suppresses occurrence of flickering that is caused when displaying dynamic images due to the emission luminance of each area being determined on the basis of a maximum or mean value of pixel luminances within that area.

An emission luminance calculation section (151) divides an input image (31) into a plurality of areas, and obtains luminances upon emission of LEDs (first emission luminances) (32) in the areas. A maximum luminance position eccentricity coefficient calculation section (152) obtains maximum luminance position eccentricity coefficients (33) indicating maximum luminance positions in the areas. An emission luminance correction section (153) corrects the first emission luminances (32) on the basis of the maximum luminance position eccentricity coefficients (33) and contribution ratios (34) stored in an LED filter (156). At this time, luminances of areas positioned in the same direction as the maximum luminance positions are set to be relatively high, and luminances of areas positioned in the opposite direction to the maximum luminance positions are set to be relatively low.

14 Claims, 21 Drawing Sheets

(56) References Cited

U.S. PATENT DOCUMENTS

| | | | |
|---|---|---|---|
| 2004/0051692 A1* | 3/2004 | Hirakata et al. | 345/102 |
| 2005/0057546 A1* | 3/2005 | Shibutani | 345/204 |
| 2005/0184952 A1 | 8/2005 | Konno et al. | |
| 2006/0279523 A1* | 12/2006 | Nitta et al. | 345/102 |
| 2009/0195565 A1* | 8/2009 | Kimura | 345/690 |
| 2009/0201245 A1* | 8/2009 | Nonaka et al. | 345/102 |
| 2009/0262063 A1* | 10/2009 | Fujine et al. | 345/102 |
| 2010/0060672 A1 | 3/2010 | Hoppenbrouwers et al. | |

* cited by examiner

Fig.9

| (−3, 3) | (−2, 3) | (−1, 3) | (0, 3) | (1, 3) | (2, 3) | (3, 3) |
|---|---|---|---|---|---|---|
| (−3, 2) | (−2, 2) | (−1, 2) | (0, 2) | (1, 2) | (2, 2) | (3, 2) |
| (−3, 1) | (−2, 1) | (−1, 1) | (0, 1) | (1, 1) | (2, 1) | (3, 1) |
| (−3, 0) | (−2, 0) | (−1, 0) | (0, 0) | (1, 0) | (2, 0) | (3, 0) |
| (−3, −1) | (−2, −1) | (−1, −1) | (0, −1) | (1, −1) | (2, −1) | (3, −1) |
| (−3, −2) | (−2, −2) | (−1, −2) | (0, −2) | (1, −2) | (2, −2) | (3, −2) |
| (−3, −3) | (−2, −3) | (−1, −3) | (0, −3) | (1, −3) | (2, −3) | (3, −3) |

| 0 | 0 | 1 | 2 | 1 | 0 | 0 |
|---|---|---|---|---|---|---|
| 0 | 18 | 51 | 81 | 51 | 18 | 0 |
| 1 | 51 | 143 | 168 | 143 | 51 | 1 |
| 2 | 81 | 168 | 255 | 168 | 81 | 2 |
| 1 | 51 | 143 | 168 | 143 | 51 | 1 |
| 0 | 18 | 51 | 81 | 51 | 18 | 0 |
| 0 | 0 | 1 | 2 | 1 | 0 | 0 |

| j \ i | -3 | -2 | -1 | 0 | 1 | 2 | 3 |
|---|---|---|---|---|---|---|---|
| 3 | 0 | 0 | 0.01 | 0.01 | 0.01 | 0 | 0 |
| 2 | 0 | 0.07 | 0.20 | 0.38 | 0.29 | 0.11 | 0 |
| 1 | 0.01 | 0.20 | 0.54 | 0.79 | 0.81 | 0.29 | 0.01 |
| 0 | 0.01 | 0.26 | 0.53 | 1.00 | 0.79 | 0.38 | 0.01 |
| -1 | 0.01 | 0.13 | 0.36 | 0.53 | 0.54 | 0.20 | 0.01 |
| -2 | 0 | 0.05 | 0.13 | 0.26 | 0.20 | 0.07 | 0 |
| -3 | 0 | 0 | 0.01 | 0.01 | 0.01 | 0 | 0 |

Fig.15

| | | | | | | |
|---|---|---|---|---|---|---|
| 0 | 0 | 1 | 3 | 2 | 0 | 0 |
| 0 | 18 | 49 | 98 | 74 | 27 | 0 |
| 1 | 49 | 137 | 202 | 206 | 74 | 2 |
| 2 | 65 | 134 | 255 | 202 | 98 | 3 |
| 1 | 33 | 91 | 134 | 137 | 49 | 1 |
| 0 | 12 | 33 | 65 | 49 | 18 | 0 |
| 0 | 0 | 1 | 2 | 1 | 0 | 0 |

$$j \begin{cases} 3 \\ 2 \\ 1 \\ 0 \\ -1 \\ -2 \\ -3 \end{cases}$$

| | -3 | -2 | -1 | 0 | 1 | 2 | 3 |
|---|---|---|---|---|---|---|---|
| 3 | 0 | 0 | 0.01 | 0.01 | 0.01 | 0 | 0 |
| 2 | 0 | 0.07 | 0.21 | 0.37 | 0.24 | 0.09 | 0 |
| 1 | 0.01 | 0.19 | 0.56 | 0.75 | 0.68 | 0.24 | 0.01 |
| 0 | 0.01 | 0.28 | 0.57 | 1.00 | 0.75 | 0.37 | 0.01 |
| -1 | 0.01 | 0.17 | 0.46 | 0.57 | 0.56 | 0.21 | 0.01 |
| -2 | 0 | 0.06 | 0.17 | 0.28 | 0.19 | 0.07 | 0 |
| -3 | 0 | 0 | 0.01 | 0.01 | 0.01 | 0 | 0 |

| 0 | 0 | 2 | 3 | 2 | 0 | 0 |
|---|---|---|---|---|---|---|
| 0 | 18 | 54 | 93 | 62 | 22 | 0 |
| 1 | 48 | 142 | 192 | 173 | 62 | 2 |
| 2 | 70 | 144 | 255 | 192 | 93 | 3 |
| 1 | 42 | 116 | 144 | 142 | 54 | 2 |
| 0 | 15 | 42 | 70 | 48 | 18 | 0 |
| 0 | 0 | 1 | 2 | 1 | 0 | 0 |

68

US 8,681,087 B2

IMAGE DISPLAY DEVICE AND IMAGE DISPLAY METHOD

TECHNICAL FIELD

The present invention relates to image display devices, particularly to an image display device having a function of controlling the luminance of a backlight (backlight dimming function).

BACKGROUND ART

In image display devices provided with backlights such as liquid crystal display devices, by controlling the luminances of the backlights on the basis of input images, the power consumption of the backlights can be suppressed and the image quality of a displayed image can be improved. In particular, by dividing a screen into a plurality of areas and controlling the luminances of backlight sources corresponding to the areas on the basis of portions of an input image within the areas, it is rendered possible to achieve lower power consumption and higher image quality. Hereinafter, such a method for driving a display panel while controlling the luminances of backlight sources on the basis of an input image in each area will be referred to as "area-active drive".

Liquid crystal display devices that perform area-active drive use, for example, LEDs (light emitting diodes) of three RGB colors or white LEDs, as backlight sources. Luminances of LEDs corresponding to areas are obtained on the basis of, for example, maximum or mean values of pixel luminances within the areas, and are provided to a backlight driver circuit as LED data. In addition, display data (data for controlling the light transmittance of the liquid crystal) is generated on the basis of the LED data and an input image, and the display data is provided to a driver circuit for a liquid crystal panel.

According to a liquid crystal display device such as that described above, suitable display data and LED data are obtained based on an input image, and the light transmittances of liquid crystals are controlled based on the display data, and the luminances of LEDs provided in respective areas are controlled based on the LED data, whereby the input image can be displayed on the liquid crystal panel. When the luminance of pixels in an area is low, by reducing the luminance of LEDs provided in the area, the power consumption of the backlight can be reduced.

Note that the following conventional technology document is known in the art relevant to the present invention. Japanese Laid-Open Patent Publication No. 2007-183499 discloses an invention of a display device in which, when a position exhibiting the maximum display luminance is present in the vicinity of the boundary (an extended area) between divided regions adjacent to each other, correction is performed to adjust the emission rate of one of the divided regions that has a lower luminance to match the emission rate of the other divided region with a higher luminance, thereby enhancing luminous efficiency.

PRIOR ART DOCUMENTS

Patent Documents

Patent Document 1: Japanese Laid-Open Patent Publication No. 2007-183499

SUMMARY OF THE INVENTION

Problems to be Solved by the Invention

However, in the case of image display devices that perform the aforementioned area-active drive, when displaying dynamic images with small high-tone objects moving on a low-tone background, flickering might occur on the screen due to acute changes in luminances of the LEDs corresponding to the areas. Hereinafter, this flickering will be described.

A description will be given regarding a phenomenon which might occur, for example, when dynamic images are displayed with a small white (100% luminance) rectangular object 91 moving from left to right on a black (0% luminance) background on the screen, as shown in FIG. 16. Concretely, it is assumed that the rectangular object 91 moves within horizontally continuous areas 71 to 76 (see FIG. 17) from left to right on the screen over time. Here, in the case where the rectangular object 91 moves from area 73 to area 74 in a period from point t1 to point t3, as shown in FIG. 17, emission luminances (of the LEDs) in areas 71 to 76 change as shown in FIG. 25. Specifically, during a period from point t1 to point t2, the position of the rectangular object 91 moves but the emission luminances in areas 71 to 76 do not change. Thereafter, at point t3, the emission luminances in areas 71 to 76 greatly change in accordance with the position of the rectangular object 91 moving from area 73 to area 74. The reason for this is that the emission luminance of each area is determined on the basis of a maximum or mean value of pixel luminances within that area at each time point. As a result, the emission luminance of each area greatly changes every time the rectangular object 91 as mentioned above moves across the boundary between areas, and acute changes in the emission luminances of the areas are visually recognized as flickering.

Therefore, an objective of the present invention is to suppress occurrence of flickering that is caused when displaying dynamic images due to the emission luminance of each area being determined on the basis of a maximum or mean value of pixel luminances within that area, in an image display device which performs area-active drive.

Means for Solving the Problems

A first aspect of the present invention is directed to an image display device having a function of controlling a backlight luminance, the device comprising:

a display panel including a plurality of display elements;

a backlight including a plurality of light sources;

an emission luminance calculation section for dividing an input image into a plurality of areas and obtaining luminances upon emission of light sources corresponding to each area as first emission luminances on the basis of a portion of the input image of a corresponding area;

an emission luminance correction section for obtaining second emission luminances of the plurality of areas by correcting the first emission luminances of any areas positioned within predetermined ranges from each area on the basis of a maximum luminance position for the corresponding area, the maximum luminance position being a position of a pixel having a maximum luminance value based on the input image;

a display data calculation section for obtaining display data for controlling light transmittances of the display elements, on the basis of the input image and the second emission luminances;

a panel driver circuit for outputting signals for controlling the light transmittances of the display elements to the display panel, on the basis of the display data; and a backlight driver circuit for outputting signals for controlling luminances of the light sources to the backlight, on the basis of the second emission luminances, wherein, when assuming that post-correction values for the first emission luminances based on predetermined correction data are defined as reference luminances, the emission luminance correction section obtains the second emission luminances in such a way that the second emission luminances are higher than respective reference luminances as for areas positioned on the same side as the maximum luminance position within each area with respect to the center position of the area, and the second emission luminances are lower than respective reference luminances as for areas positioned on an opposite side to the maximum luminance position within each area with respect to the center position of the area.

According to a second aspect of the present invention, in the first aspect of the present invention, the image display device further comprises an eccentricity value calculation section for obtaining an eccentricity value indicating a positional relationship between the center position and the maximum luminance position for each area, wherein the emission luminance correction section obtains the second emission luminances on the basis of the eccentricity value.

According to a third aspect of the present invention, in the second aspect of the present invention, the eccentricity value calculation section obtains the eccentricity value for each area on the basis of the distance from a vertical axis passing through the center position of the area to the maximum luminance position and the distance from a horizontal axis passing through the center position of the area to the maximum luminance position.

According to a fourth aspect of the present invention, in the second aspect of the present invention, the eccentricity value calculation section obtains the eccentricity value for each area on the basis of the distance from the center position of the area to the maximum luminance position and the angle between a straight line extending from the center position of the area to the maximum luminance position and a horizontal axis passing through the center position of the area in a positive direction from the center position.

According to a fifth aspect of the present invention, in the first aspect of the present invention, the emission luminance correction section sequentially sets the plurality of areas one by one as a focus area, and sequentially sets areas positioned within predetermined ranges from the focus area one by one as a correction target area, and corrects the luminance of the correction target area, thereby performing luminance correction more than once per area when obtaining the second emission luminances from the first emission luminances, when performing the luminance correction once for each area, the emission luminance correction section obtains a second coefficient, on the basis of a first coefficient previously set as the correction data in accordance with a positional relationship between the focus area and the correction target area and also on the basis of the eccentricity value for the focus area, and sets a post-correction luminance of the correction target area, the post-correction luminance being either a luminance obtained by multiplying the first emission luminance of the focus area by the second coefficient or a pre-correction luminance of the correction target areas and being the greater of the two, when performing a first luminance correction for each area, the emission luminance correction section sets the first emission luminance of the area as the pre-correction luminance, and the emission luminance correction section sets the post-correction luminance obtained by the last luminance correction for each area as the second emission luminance.

According to a sixth aspect of the present invention, in the first aspect of the present invention, the emission luminance correction section sequentially sets the plurality of areas one by one as a focus area, and sequentially sets areas positioned within predetermined ranges from the focus area one by one as a correction target area, and corrects the luminance of the correction target area, thereby performing luminance correction more than once per area when obtaining the second emission luminances from the first emission luminances, when performing the luminance correction once for each area, the emission luminance correction section obtains a second coefficient, on the basis of a first coefficient previously set as the correction data in accordance with a positional relationship between the focus area and the correction target area and also on the basis of the eccentricity value for the focus area, and sets a post-correction luminance of the correction target area, the post-correction luminance being obtained by adding a luminance obtained by multiplying the first emission luminance of the focus area by the second coefficient to the pre-correction luminance of the correction target area, when performing a first luminance correction for each area, the emission luminance correction section sets the first emission luminance of the area as the pre-correction luminance, and the emission luminance correction section sets the post-correction luminance obtained by the last luminance correction for each area as the second emission luminance.

According to a seventh aspect of the present invention, in the fifth aspect of the present invention, the emission luminance correction section obtains the second emission luminances of the plurality of areas such that the second emission luminance of the correction target area is higher than the first emission luminance of the correction target area when the first emission luminance of the focus area is not 0.

An eighth aspect of the present invention is directed to an image display method in an image display device provided with a display panel including a plurality of display elements and a backlight including a plurality of light sources, the method comprising:

an emission luminance calculation step for dividing an input image into a plurality of areas and obtaining luminances upon emission of light sources corresponding to each area as first emission luminances on the basis of a portion of the input image of a corresponding area;

an emission luminance correction step for obtaining second emission luminances of the plurality of areas by correcting the first emission luminances of any areas positioned within predetermined ranges from each area on the basis of a maximum luminance position for the corresponding area, the maximum luminance position being a position of a pixel having a maximum luminance value based on the input image;

a display data calculation step for obtaining display data for controlling light transmittances of the display elements, on the basis of the input image and the second emission luminances;

a panel drive step for outputting signals for controlling the light transmittances of the display elements to the display panel, on the basis of the display data; and a backlight drive step for outputting signals for controlling luminances of the light sources to the backlight, on the basis of the second emission luminances, wherein, when assuming that post-correction values for the first emission luminances based on predetermined correction data are defined as reference luminances, in the emission luminance correction step, the second emission luminances are obtained in such a way that the second emission luminances are higher than respective reference luminances as for areas positioned on the same side as the maximum luminance position within each area with respect to the center position of the area, and the second emission luminances are lower than respective reference luminances as for areas positioned on an opposite side to the maximum luminance position within each area with respect to the center position of the area.

In addition, variants that are grasped by referring to the embodiment and the drawings in the eighth aspect of the present invention are considered to be means for solving the problems.

Effects of the Invention

According to the first aspect of the present invention, emission luminances of areas surrounding each area are corrected in accordance with a position of a pixel having a maximum luminance (a maximum luminance position) in the area. At this time, emission luminances of surrounding areas on the same side as the maximum luminance position with respect to the center position of each area are set to be relatively high, and emission luminances of surrounding areas on the opposite side to the maximum luminance position with respect to the center position of each area are set to be relatively low. As a result, in the case where dynamic images are displayed with a small high-tone object moving on a low-tone background, even during a period in which the object is moving within an area, emission luminances of areas surrounding that area change. Specifically, the emission luminance of each area gradually changes as the object moves. Accordingly, the emission luminance of each area do not greatly change when the object moves across the boundary between areas. Thus, it is possible to suppress occurrence of flickering that is caused due to the emission luminance of each area being determined on the basis of a maximum or mean value of pixel luminances within that area.

According to the second aspect of the present invention, emission luminances of areas surrounding each area are determined on the basis of the positional relationship between the center position and the maximum luminance position for that area. Accordingly, when displaying dynamic images with a small high-tone object moving on a low-tone background, the emission luminance of an area can be increased as the object approaches that area, and also can be decreased as the object moves away from that area. Thus, it is possible to allow the backlight to emit light such that a more appropriate luminance distribution can be achieved on the display panel.

According to the third aspect of the present invention, an effect similar to that achieved by the second aspect of the invention can be achieved with a relatively simplified configuration.

According to the fourth aspect of the present invention, an eccentricity value for calculating emission luminances of areas is obtained on the basis of a positional relationship that takes an angle between the areas into consideration and a positional relationship that takes an angle from the center position of the area to the maximum luminance position into consideration. Thus, it is possible to allow the backlight to emit light such that a more appropriate luminance distribution can be achieved on the display panel in accordance with the degree of deviations of the maximum luminance position from the center position in each area.

According to the fifth aspect of the present invention, it is possible to suppress occurrence of flickering that is caused due to the emission luminance of each area being determined on the basis of a maximum or mean value of pixel luminances within that area, as in the first aspect of the invention.

According to the sixth aspect of the present invention, it is possible to suppress occurrence of flickering that is caused due to the emission luminance of each area being determined on the basis of a maximum or mean value of pixel luminances within that area, as in the first aspect of the invention.

According to the seventh aspect of the present invention, when light sources in an area are lit upon the basis of an input image, luminances of areas surrounding that area are enhanced. Accordingly, when lighting up a single area, light sources of areas surrounding the area to be lit up are also lit up. As a result, the display luminance of the area to be lit up is enhanced compared to conventional, so that insufficient luminance when lighting up a single area is overcome.

BRIEF DESCRIPTION OF THE DRAWINGS

FIG. 9 is a diagram describing local coordinates in the first embodiment.

FIG. 13 is a diagram showing secondary luminance values for surrounding areas where the secondary luminance values for the areas are calculated without considering a maximum luminance position in a focus area.

FIG. 14 is a diagram showing contribution ratios for areas in the first embodiment.

FIG. 15 is a diagram showing secondary luminance values for areas in the first embodiment.

FIG. 23 is a diagram showing contribution ratios for areas in the second embodiment.

FIG. 24 is a diagram showing secondary luminance values for areas in the second embodiment.

MODE FOR CARRYING OUT THE INVENTION

Hereinafter, embodiments of the present invention will be described with reference to the accompanying drawings.

<1. First Embodiment>
<1.1 Overall Configuration and Overview of the Operation>

Figure 2:
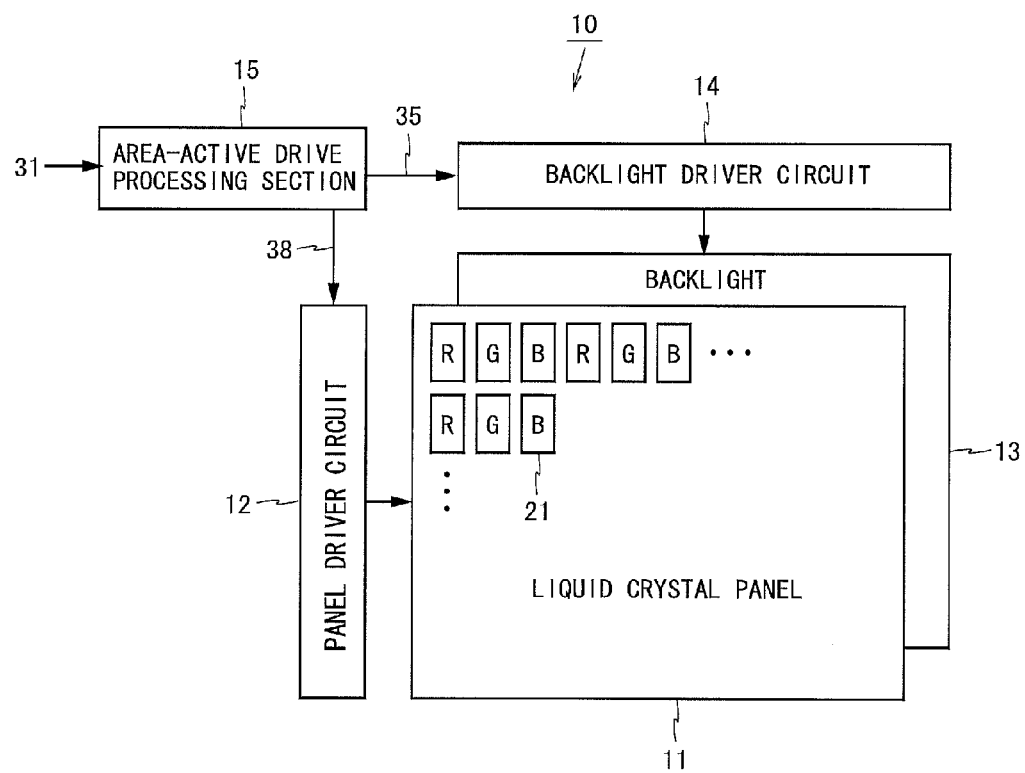
FIG. 2 is a block diagram illustrating the configuration of a liquid crystal display device according to the first embodiment.

FIG. 2 is a block diagram illustrating the configuration of a liquid crystal display device 10 according to a first embodiment of the present invention. The liquid crystal display device 10 shown in FIG. 2 includes a liquid crystal panel 11, a panel driver circuit 12, a backlight 13, a backlight driver circuit 14, and an area-active drive processing section 15. The liquid crystal display device 10 performs area-active drive in which the liquid crystal panel 11 is driven with luminances of backlight sources being controlled on the basis of input image portions within a plurality of areas defined by dividing the screen. In the following, m and n are integers of 2 or more, p and q are integers of 1 or more, but at least one of p and q is an integer of 2 or more.

The liquid crystal display device 10 receives an input image 31 including an R image, a G image, and a B image. Each of the R, G, and B images includes luminances for (m×n) pixels. On the basis of the input image 31, the area-active drive processing section 15 obtains display data (hereinafter, referred to as "liquid crystal data 38") for use in driving the liquid crystal panel 11 and emission luminance control data (hereinafter, referred to as "LED data 35") for use in driving the backlight 13 (details will be described later).

The liquid crystal panel 11 includes (m×n×3) display elements 21. The display elements 21 are arranged two-dimensionally as a whole, with each row including 3m of them in its direction (in FIG. 2, horizontally) and each column including n of them in its direction (in FIG. 2, vertically). The display elements 21 include R, G, and B display elements respectively transmitting red, green, and blue light therethrough. The R display elements, the G display elements, and the B display elements are arranged side by side in the row direction, and three display elements form a single pixel. However, the arrangement of display elements is not limited to this pattern.

The panel driver circuit 12 is a circuit for driving the liquid crystal panel 11. On the basis of liquid crystal data 38 outputted by the area-active drive processing section 15, the panel driver circuit 12 outputs signals (voltage signals) for controlling light transmittances of the display elements 21 to the liquid crystal panel 11. The voltages outputted by the panel driver circuit 12 are written to pixel electrodes in the display elements 21, and the light transmittances of the display elements 21 change in accordance with the voltages written to the pixel electrodes.

Figure 3:
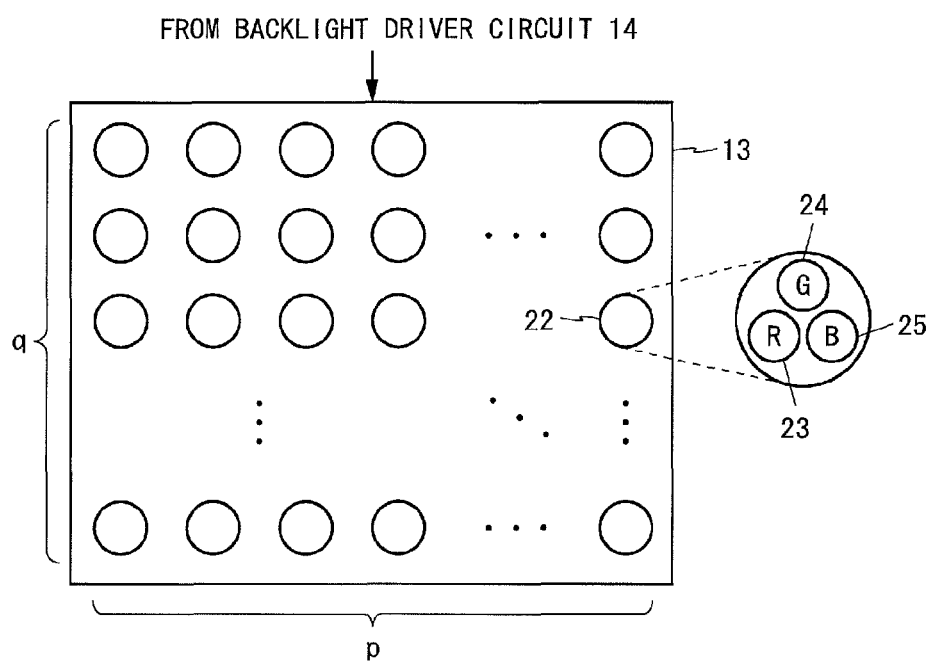
FIG. 3 is a diagram illustrating details of a backlight shown in FIG. 2.

The backlight 13 is provided at the back side of the liquid crystal panel 11 to irradiate backlight light to the back of the liquid crystal panel 11. FIG. 3 is a diagram illustrating details of the backlight 13. The backlight 13 includes (p×q) LED units 22, as shown in FIG. 3. The LED units 22 are arranged two-dimensionally as a whole, with each row including p of them in its direction and each column including q of them in its direction. Each of the LED units 22 includes one red LED 23, one green LED 24, and one blue LED 25. Lights emitted from the three LEDs 23 to 25 included in one LED unit 22 hit a part of the back of the liquid crystal panel 11.

The backlight driver circuit 14 is a circuit for driving the backlight 13. On the basis of LED data 35 outputted by the area-active drive processing section 15, the backlight driver circuit 14 outputs signals (pulse signals PWM or current signals) for controlling luminances of the LEDs 23 to 25 to the backlight 13. The luminances of the LEDs 23 to 25 are controlled independently of luminances of LEDs inside and outside their units.

The screen of the liquid crystal display device 10 is divided into (p×q) areas, each area corresponding to one LED unit 22. However, for the reason of insufficient luminance, for example, a set of a plurality of LED units can be used for each area. In such a case, the LED units simultaneously emit light to achieve a luminance passed to their area by the backlight driver circuit 14. For each of the (p×q) areas, the area-active drive processing section 15 obtains the luminance (luminance upon emission) of the red LEDs 23 that correspond to that area on the basis of an R image within that area. Similarly, the luminance of the green LEDs 24 is determined on the basis of a G image within the area, and the luminance of the blue LEDs 25 is determined on the basis of a B image within the area. The area-active drive processing section 15 obtains luminances for all LEDs 23 to 25 included in the backlight 13, and outputs LED data 35 representing the obtained luminances to the backlight driver circuit 14.

Furthermore, on the basis of the LED data 35, the area-active drive processing section 15 obtains luminances of backlight lights (the luminances that can be achieved upon display; hereinafter, referred to as "display luminances") for all display elements 21 included in the liquid crystal panel 11. In addition, on the basis of an input image 31 and the display luminances, the area-active drive processing section 15 obtains light transmittances of all of the display elements 21 included in the liquid crystal panel 11, and outputs liquid crystal data 38 representing the obtained light transmittances to the panel driver circuit 12.

In the liquid crystal display device 10, the luminance of each R display element is the product of the luminance of red light emitted by the backlight 13 and the light transmittance of that R display element. Light emitted by one red LED 23 hits a plurality of areas around one corresponding area. Accordingly, the luminance of each R display element is the product of the total luminance of light emitted by a plurality of red LEDs 23 and the light transmittance of that R display element. Similarly, the luminance of each G display element is the product of the total luminance of light emitted by a plurality of green LEDs 24 and the light transmittance of that G display element, and the luminance of each B display element is the product of the total luminance of light emitted by a plurality of blue LEDs 25 and the light transmittance of that B display element.

According to the liquid crystal display device 10 thus configured, suitable liquid crystal data 38 and LED data 35 are obtained on the basis of the input image 31, the light transmittances of the display elements 21 are controlled on the basis of the liquid crystal data 38, and the luminances of the LEDs 23 to 25 are controlled on the basis of the LED data 35, so that the input image 31 can be displayed on the liquid crystal panel 11. In addition, when luminances of pixels within an area are low, luminances of LEDs 23 to 25 corresponding to that area are kept low, thereby reducing power consumption of the backlight 13. Moreover, when luminances of pixels within an area are low, luminances of display elements 21 corresponding to that area are switched among a smaller number of levels, making it possible to enhance image resolution and thereby to improve display image quality.

Figure 4:
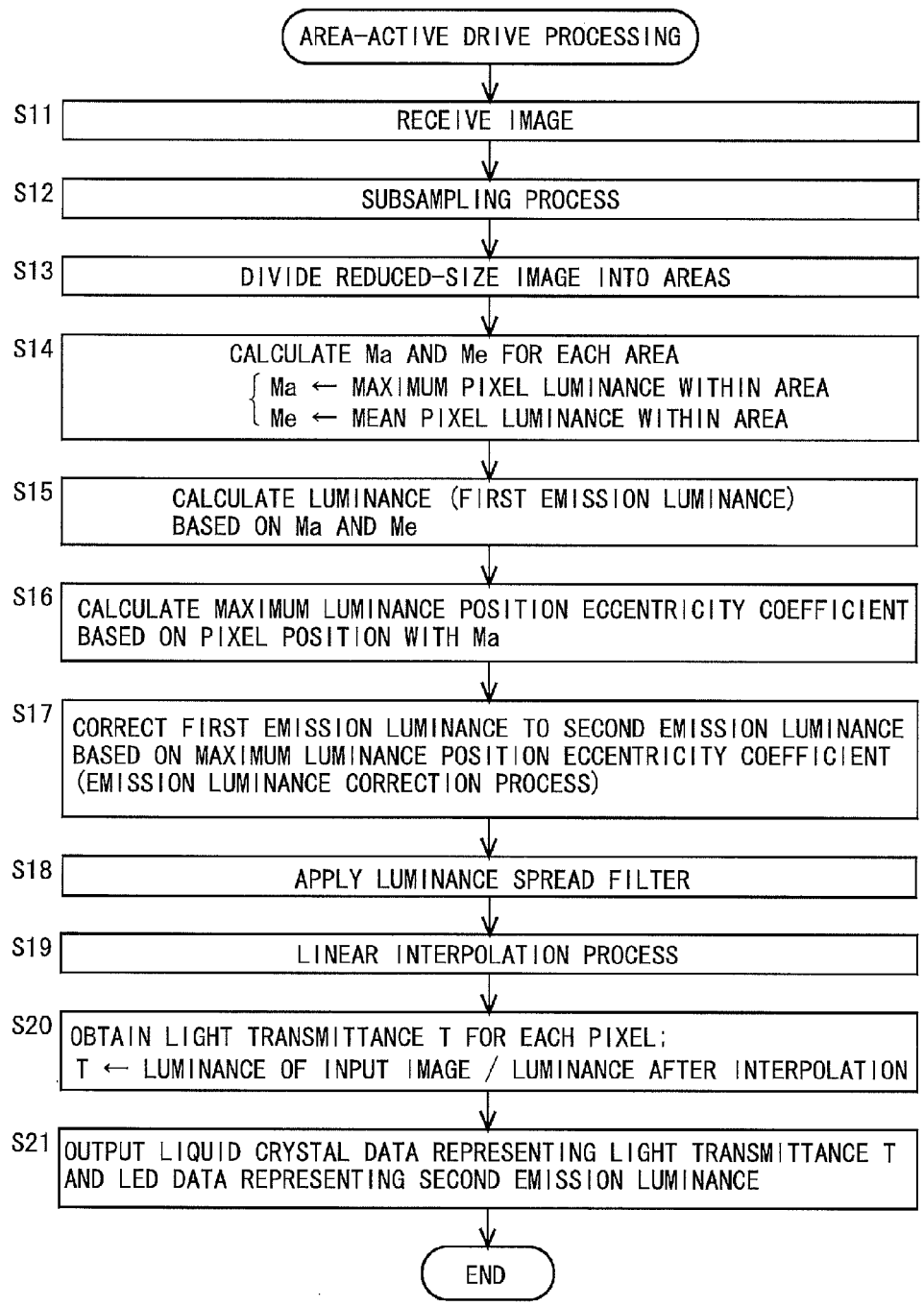
FIG. 4 is a flowchart showing a process by the area-active drive processing section in the first embodiment.

FIG. 4 is a flowchart showing a process by the area-active drive processing section 15. The area-active drive processing section 15 receives an image for a color component (hereinafter, referred to as color component C) included in the input image 31 (step S11). The input image for color component C includes luminances for (m×n) pixels.

Next, the area-active drive processing section 15 performs a subsampling process (averaging process) on the input image for color component C, and obtains a reduced-size image including luminances for (sp×sq) (where s is an integer of 2 or more) pixels (step S12). In step S12, the input image for color component C is reduced to sp/m in the horizontal direction and sq/n in the vertical direction. Then, the area-active drive processing section 15 divides the reduced-size image into (p×q) areas (step S13). Each area includes luminances for (s×s) pixels. Next, for each of the (p×q) areas, the area-active drive processing section 15 obtains a maximum value Ma of pixel luminances within that area and a mean value Me of pixel luminances within that area (step S14). Then, on the basis of the maximum value Ma and the mean value Me and so on obtained in step S14, the area-active drive processing section 15 obtains luminances upon emission of LEDs corresponding to each area (step S15). Note that the luminances obtained in step S15 will be referred to below as "first emission luminances".

Next, for each area, the area-active drive processing section 15 obtains the position to which data for the maximum luminance in the input image 31 corresponds in that area (hereinafter, the position of the data for the maximum luminance will be referred to as the "maximum luminance position"), and also obtains a coefficient (hereinafter, referred to as a "maximum luminance position eccentricity coefficient") representing the degree of the maximum luminance position deviating from the center position of the area (step S16). In the present embodiment, the maximum luminance position eccentricity coefficient realizes an eccentricity value. Note that calculation of the maximum luminance position eccentricity coefficient will be described in detail later. Next, the area-active drive processing section 15 corrects the first emission luminances to second emission luminances on the basis of the maximum luminance position eccentricity coefficient obtained in step S16 (step S17). This correction process (hereinafter, referred to as an "emission luminance correction process") will be described in detail later.

Next, the area-active drive processing section 15 applies a luminance spread filter to the (p×q) second emission luminances obtained in step S17, thereby obtaining first backlight luminance data including (tp×tq) (where t is an integer of 2 or more) display luminances (step S18). In step S18, the (p×q) second emission luminances are scaled up by a factor of t in both in the horizontal and the vertical direction.

Next, the area-active drive processing section 15 performs a linear interpolation process on the first backlight luminance data, thereby obtaining second backlight luminance data including (m×n) display luminances (step S19). In step S19, the first backlight luminance data is scaled up by a factor of (m/tp) in the horizontal direction and a factor of (n/tq) in the vertical direction. The second backlight luminance data represents luminances of backlight lights for color component C that enter (m×n) display elements 21 for color component C when (p×q) LEDs for color component C emit lights at the second emission luminances obtained in step S17.

Next, the area-active drive processing section 15 divides the luminances of the (m×n) pixels included in the input image for color component C respectively by the (m×n) display luminances included in the second backlight luminance data, thereby obtaining light transmittances T of the (m×n) display elements 21 for color component C (step S20).

Finally, for color component C, the area-active drive processing section 15 outputs liquid crystal data 38 representing the (m×n) light transmittances T obtained in step S20, and LED data 35 representing the (p×q) second emission luminances obtained in step S17 (step S21). At this time, the liquid crystal data 38 and the LED data 35 are converted to values within appropriate ranges in conformity with the specifications of the panel driver circuit 12 and the backlight driver circuit 14.

The area-active drive processing section 15 performs the process shown in FIG. 4 on an R image, a G image, and a B image, thereby obtaining liquid crystal data 38 representing (m×n×3) transmittances and LED data 35 representing (p×q×3) second emission luminances, on the basis of an input image 31 including luminances of (m×n×3) pixels.

Figure 5:
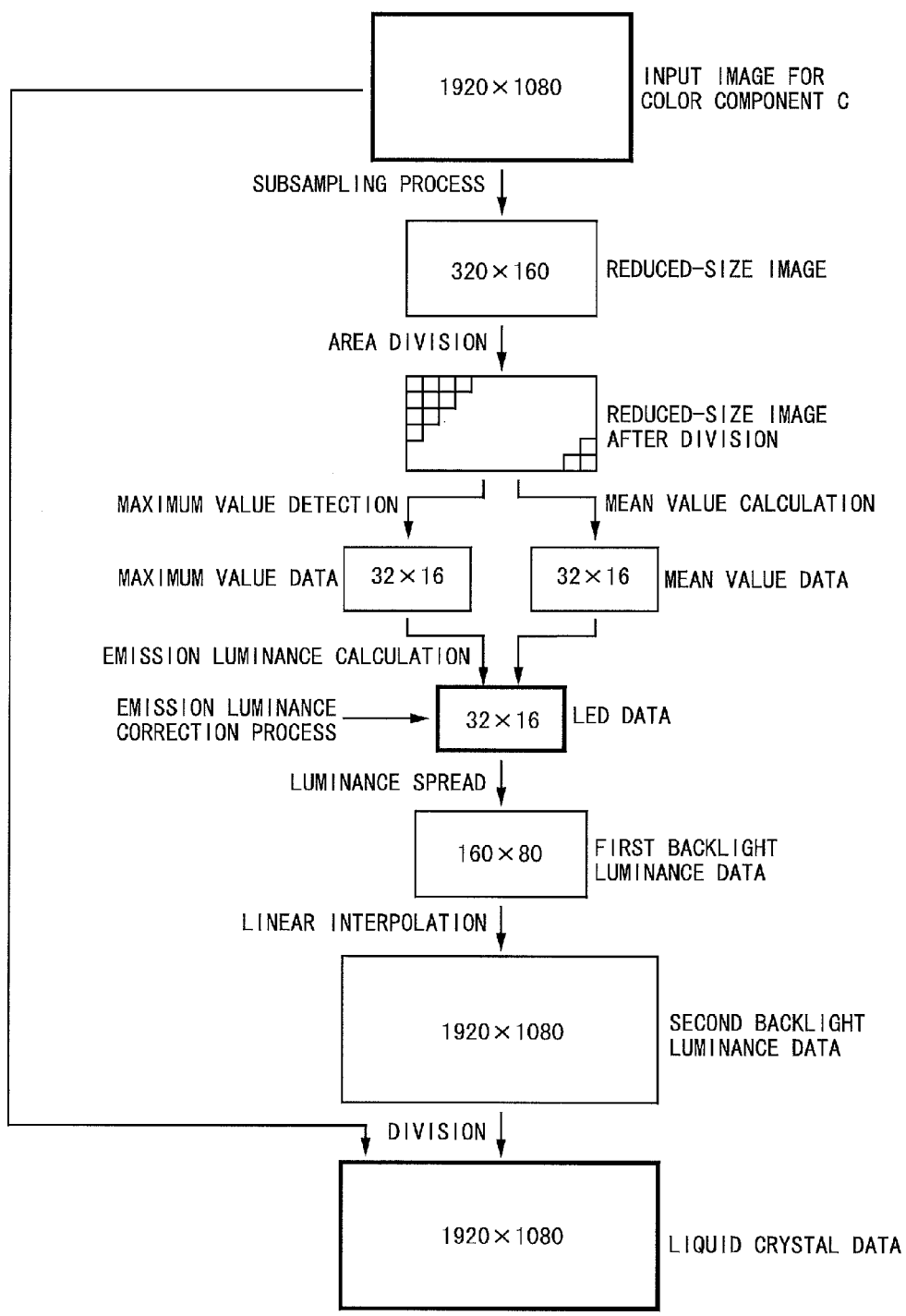
FIG. 5 is a diagram showing the course of action up to obtaining liquid crystal data and LED data in the first embodiment.

FIG. 5 is a diagram showing the course of action up to obtaining liquid crystal data and LED data where m=1920, n=1080, p=32, q=16, s=10, and t=5. As shown in FIG. 5, a subsampling process is performed on an input image for color component C, which includes luminances of (1920×1080) pixels, thereby obtaining a reduced-size image including luminances of (320×160) pixels. The reduced-size image is divided into (32×16) areas (the size of each area is (10×10) pixels). By calculating the maximum value Ma and the mean value Me of the pixel luminances for each area, maximum value data including (32×16) maximum values and mean value data including (32×16) mean values are obtained. Then, on the basis of the maximum value data, the mean value data, etc., (32×16) emission luminances (first emission luminances) are obtained. The first emission luminances are corrected by the emission luminance correction process to obtain LED data for color component C, which represents (32×16) emission luminances (second emission luminances).

By applying the luminance spread filter to the LED data for color component C, first backlight luminance data including (160×80) luminances is obtained, and by performing a linear interpolation process on the first backlight luminance data, second backlight luminance data including (1920×1080) luminances is obtained. Finally, by dividing the pixel luminances included in the input image by the luminances included in the second backlight luminance data, liquid crystal data for color component C, which includes (1920×1080) light transmittances, is obtained.

Note that in FIGS. 4 and 5, for ease of explanation, the area-active drive processing section 15 sequentially performs the process on images for color components, but the process may be performed on the images for color components in a time-division manner. Furthermore, in FIGS. 4 and 5, the area-active drive processing section 15 performs a subsampling process on an input image for noise removal and performs area-active drive on the basis of a reduced-size image, but the area active drive may be performed on the basis of the original input image.

<1.2 Configuration of the Area-Active Drive Processing Section>

Figure 1:
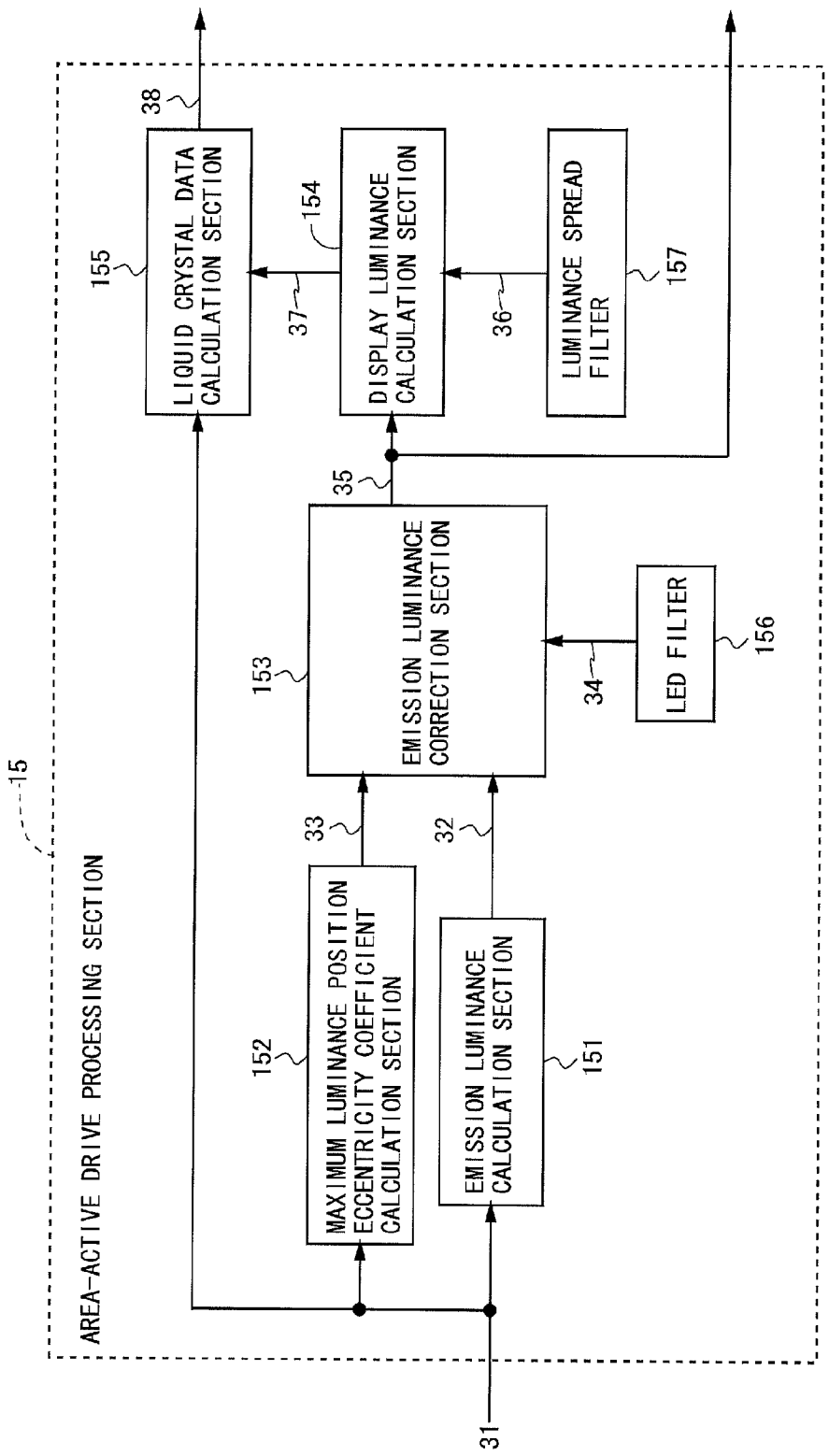
FIG. 1 is a block diagram illustrating a detailed configuration of an area-active drive processing section in a first embodiment of the present invention

FIG. 1 is a block diagram illustrating a detailed configuration of the area-active drive processing section 15 in the present embodiment. The area-active drive processing section 15 includes, as components for performing a predetermined process, an emission luminance calculation section 151, a maximum luminance position eccentricity coefficient calculation section 152, an emission luminance correction section 153, a display luminance calculation section 154, and a liquid crystal data calculation section 155, and also includes, as components for storing predetermined data, an LED filter 156 and a luminance spread filter 157. Note that in the present embodiment, the maximum luminance position eccentricity coefficient calculation section 152 realizes an eccentricity value calculation section, and the display luminance calculation section 154 and the liquid crystal data calculation section 155 realize a display data calculation section.

The emission luminance calculation section 151 divides an input image 31 into a plurality of areas, and obtains luminances upon emission of LEDs corresponding to the areas (first emission luminances as mentioned above) on the basis of the input image 31. Examples of the method for calculating the luminances include a method that makes a determination on the basis of a maximum value Ma of pixel luminances within each area, a method that makes a determination on the basis of a mean value Me of pixel luminances within each area, and a method that makes a determination on the basis of a value obtained by calculating a weighted mean of the maximum value Ma and the mean value Me of pixel luminances within each area.

The maximum luminance position eccentricity coefficient calculation section 152 obtains the aforementioned maximum luminance position eccentricity coefficient 33 for each area on the basis of a maximum luminance position. Here, how the maximum luminance position eccentricity coefficient 33 is obtained in the present embodiment will be described with reference to FIG. 6. Note that in the present embodiment, as the maximum luminance position eccentricity coefficient 33, a horizontal eccentricity coefficient Kh representing the degree of deviation from the center position in the horizontal direction and a vertical eccentricity coefficient Kv representing the degree of deviation from the center position in the vertical direction are calculated.

Figure 6:
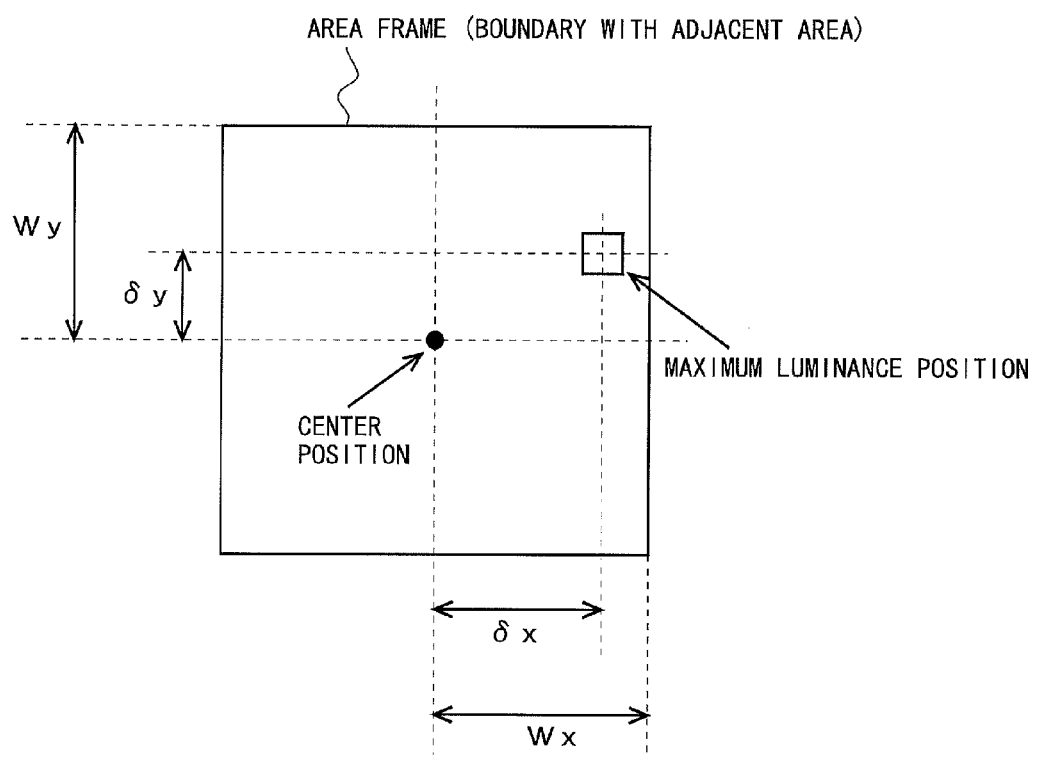
FIG. 6 is a diagram describing calculation of a maximum luminance position eccentricity coefficient in the first embodiment.

The area shown in FIG. 6 has horizontal sides of 2Wx each in length and vertical sides of 2Wy each in length. Accordingly, the distance from the center position to a horizontally adjacent area is Wx, and the distance from the center position to a vertically adjacent area is Wy. In addition, a position at a distance of δx horizontally (rightward) from the center position and at a distance of δy vertically (upward) from the center position is the maximum luminance position in the area. In this case, the horizontal eccentricity coefficient Kh is calculated by equation (1) below, and the vertical eccentricity coefficient Kv is calculated by equation (2) below.

$$Kh = \delta x / Wx \quad (1)$$

$$Kv = \delta y / Wy \quad (2)$$

Note that when the maximum luminance position is at the right of the center position, δx in equation (1) takes a positive value, and when the maximum luminance position is at the left of the center position, δx in equation (1) takes a negative value. In addition, when the maximum luminance position is above the center position, δy in equation (2) takes a positive value, and when the maximum luminance position is below the center position, δy in equation (2) takes a negative value.

In this manner, the maximum luminance position eccentricity coefficient calculation section 152 calculates the maximum luminance position eccentricity coefficients 33 for all areas included within the panel. Subsequently, the maximum luminance position eccentricity coefficients 33 are provided to the emission luminance correction section 153.

Figure 7:
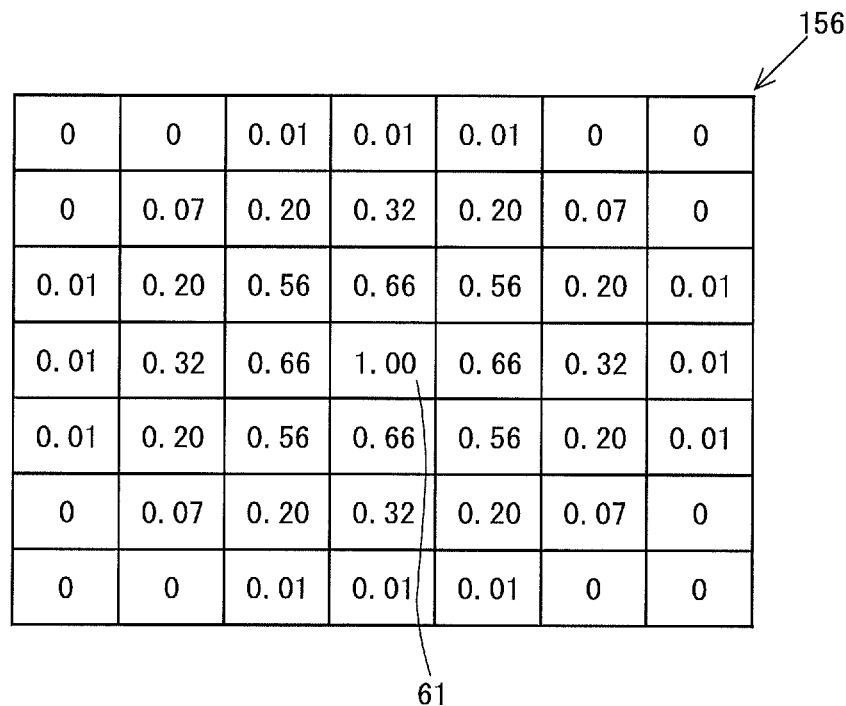
FIG. 7 is a diagram illustrating an example LED filter in the first embodiment.

The LED filter 156 has stored therein data for correcting the first emission luminances 32 calculated by the emission luminance calculation section 151. For example, the LED filter 156 is as schematically shown in FIG. 7. The LED filter 156 has stored therein ratios of luminances (hereinafter, referred to as "contribution ratios") of surrounding areas to the luminance of an arbitrary area of focus (here, the area being denoted by character "61"), the contribution ratios being used to make the luminances of the surrounding areas higher than those in the original so as to assist the brightness of the area 61.

On the basis of the maximum luminance position eccentricity coefficients 33 calculated by the maximum luminance position eccentricity coefficient calculation section 152 and the contribution ratios 34 stored in the LED filter 156, the emission luminance correction section 153 corrects the first emission luminances 32 calculated by the emission luminance calculation section 151. By this correction, a second emission luminance is calculated for each area of the panel. LED data 35 indicating the second emission luminance is provided to the backlight driver circuit 14 and also to the display luminance calculation section 154.

Figure 8:
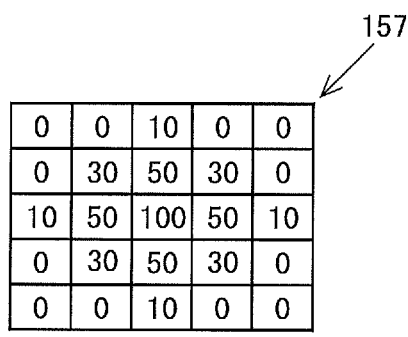
FIG. 8 is a diagram illustrating an example luminance spread filter in the first embodiment.

The luminance spread filter 157 has stored therein numerical data (hereinafter, referred to as "light spread data") indicating how light emitted by LEDs in arbitrary areas is spread. Specifically, values for the luminances appearing in the area and its surrounding areas in the case where the luminance appearing in that area is assumed to take a value of "100" when LEDs in one area emit light are stored in the luminance spread filter 157 as the light spread data. For example, the light spread data is stored in the luminance spread filter 157 as shown in FIG. 8.

On the basis of the LED data (second emission luminances) 35 obtained by the emission luminance correction section 153 and the light spread data 36 stored in the luminance spread filter 157, the display luminance calculation section 154 obtains display luminances 37 for all display elements 21 included in the liquid crystal panel 11. On the basis of the input image 31 and the display luminances 37, the liquid crystal data calculation section 155 obtains liquid crystal data 38 representing light transmittances of all of the display elements 21 included in the liquid crystal panel 11.

Note that in the present embodiment, the contribution ratios stored in the LED filter 156 realize first coefficients.

<1.3 Emission Luminance Correction Process>

Figure 10:
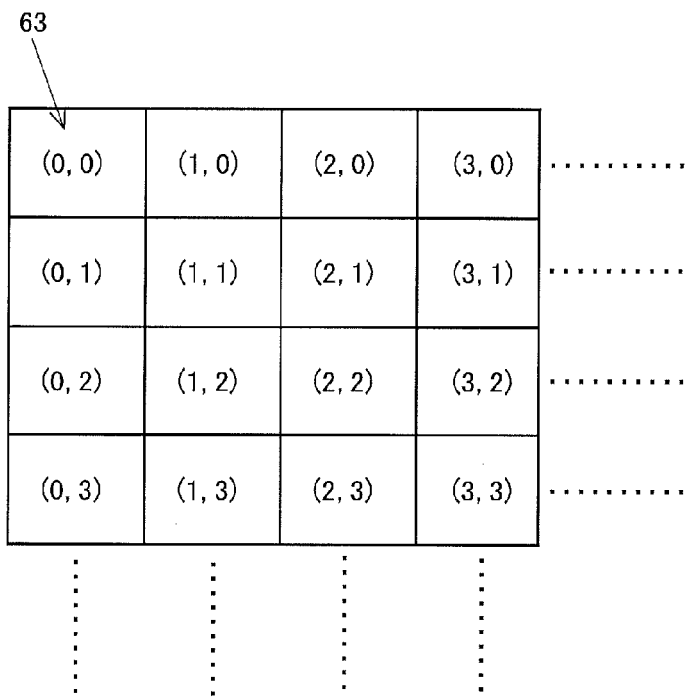
FIG. 10 is a diagram describing global coordinates in the first embodiment.

Hereinafter, the emission luminance correction process in the present embodiment will be described in detail. Note that in the following, assuming that an arbitrary area is centered, coordinates of the surrounding areas with respect to that area will be referred to as "local coordinates". In addition, coordinates of each area with respect to an area in the upper left corner of the panel will be referred to as "global coordinates". For the local coordinates, the coordinates of the center area are represented by (0,0), and the coordinates of an area positioned i'th to the right of the center area and j'th thereabove are represented by (i,j) with the rightward and upward directions being set as positive. For the global coordinates, the coordinates of the area in the upper left corner of the panel are represented by (0,0), and the coordinates of an area positioned I'th to the right of the area in the upper left corner of the panel and J'th therebelow are represented by (I,J) with the rightward and downward directions being set as positive. FIG. 9 shows local coordinates of areas with an area denoted by character "62" at the center. FIG. 10 shows global coordinates of areas with an area denoted by character "63" in the upper left corner of the panel.

In the emission luminance correction process, the areas within the panel are sequentially set one by one as a focus area, and the luminances (first emission luminances) of areas surrounding the focus area are corrected. In the present embodiment, the correction is performed on areas positioned within a range of seven areas in the horizontal direction and seven areas in the vertical direction with the focus area being centered. However, when the first emission luminance of the focus area is 0, the luminances of the areas surrounding the focus area are not corrected. Here, a position at a distance of δx horizontally (rightward) from the center position and at a distance of δy vertically (upward) from the center position is assumed to be the maximum luminance position in the focus area, as shown in FIG. 6. In this case, the luminances of the areas surrounding the focus area are corrected in a manner below. Note that the global coordinates of the focus area are (I,J).

While the emission luminance correction process is performed by the emission luminance correction section 153, the maximum luminance position eccentricity coefficient calculation section 152 calculates beforehand the maximum luminance position eccentricity coefficients (the horizontal eccentricity coefficient Kh and the vertical eccentricity coefficient Kv) for each area on the basis of the maximum luminance position within that area. Then, using the maximum luminance position eccentricity coefficients, the emission luminance correction section 153 initially obtains modification coefficients (a horizontal modification coefficient and a vertical modification coefficient) for adjusting the magnitudes of post-correction luminance values. The horizontal modification coefficient Rh(I,J) for the focus area is calculated by equation (3) below.

$$Rh(I,J) = T \cdot Kh \qquad (3)$$
$$= T \cdot \delta x / Wx$$

Likewise, the vertical modification coefficient Rv(I,J) for the focus area is calculated by equation (4) below.

$$Rv(I,J) = T \cdot Kv \qquad (4)$$
$$= T \cdot \delta y / Wy$$

In equations (3) and (4), T is an adjustment coefficient set for each device to adjust the magnitudes of the modification coefficients.

Note that in the present embodiment, the adjustment coefficient T is commonly used in equations (3) and (4), but the present invention is not limited to this. For example, in the case where optical properties of the backlight vary in the horizontal and vertical directions of the panel, to allow luminance adjustments with higher accuracy, different adjustment coefficients T may be used in equations (3) and (4).

As can be appreciated from equation (3), when δx takes a positive value, i.e., when the maximum luminance position is at the right of the center position, the horizontal modification coefficient Rh(I,J) takes a positive value. On the other hand, when δx takes a negative value, i.e., when the maximum luminance position is at the left of the center position, the horizontal modification coefficient Rh(I,J) takes a negative value. In addition, as can be appreciated from equation (4), when δy takes a positive value, i.e., when the maximum luminance position is above the center position, the vertical modification coefficient Rv(I,J) takes a positive value. On the other hand, when δy takes a negative value, i.e., when the maximum luminance position is below the center position, the vertical modification coefficient Rv(I,J) takes a negative value.

Next, on the basis of the horizontal modification coefficient Rh(I,J) and the vertical modification coefficient Rv(I,J) for the focus area with its local coordinates at (0,0), the contribution ratio for each area stored in the LED filter 156 is corrected. Concretely, for an area with local coordinates (i,j), its post-correction contribution ratio E(i,j) is calculated by equation (5) below. Note that in the present embodiment, the contribution ratio E(i,j) realizes a second coefficient.

$$E(i,j)=(1+S(i)\cdot Rh(I,J))\cdot(1+S(j)\cdot Rv(I,J))\cdot C(i,j) \qquad (5)$$

Here, S(a) is a function which returns 0 when a=0, returns 1 when a>0, and returns −1 when a<0. In addition, C(i,j) is a pre-correction contribution ratio for the area with local coordinates (i,j) stored in the LED filter 156.

By the way, as for equations (1) and (2), δx takes a value between 0 and Wx, and δy takes a value between 0 and Wy. In addition, S(i) and S(j) take values of −1, 0, or 1. Accordingly, the maximum luminance position eccentricity coefficient takes a value between −1 and 1. Therefore, the modification coefficients (the horizontal modification coefficient and the vertical modification coefficient) obtained by equations (3) and (4) take values between −T and T. Thus, the contribution ratio E(i,j) obtained by equation (5) takes a value within the range from "$(1-T)^2 \cdot C(i,j)$" to "$(1+T)^2 \cdot C(i,j)$".

Next, using the contribution ratios E(i,j) calculated by equation (5), post-correction luminance values Vlb(i,j) for areas surrounding the focus area are obtained. Concretely, for an area with local coordinates (i,j), its post-correction luminance value Vlb(i,j) is calculated by equation (6) below.

$$Vlb(i,j)=\text{MAX}(Vlo(i,j),E(i,j)\cdot Vlo(0,0)) \qquad (6)$$

Here, MAX(a,b) is a function which returns a larger value of either a or b. Vlo(i,j) is a pre-correction luminance value for the area with local coordinates (i,j). Vlo(0,0) is a first emission luminance of the focus area.

Figure 11:
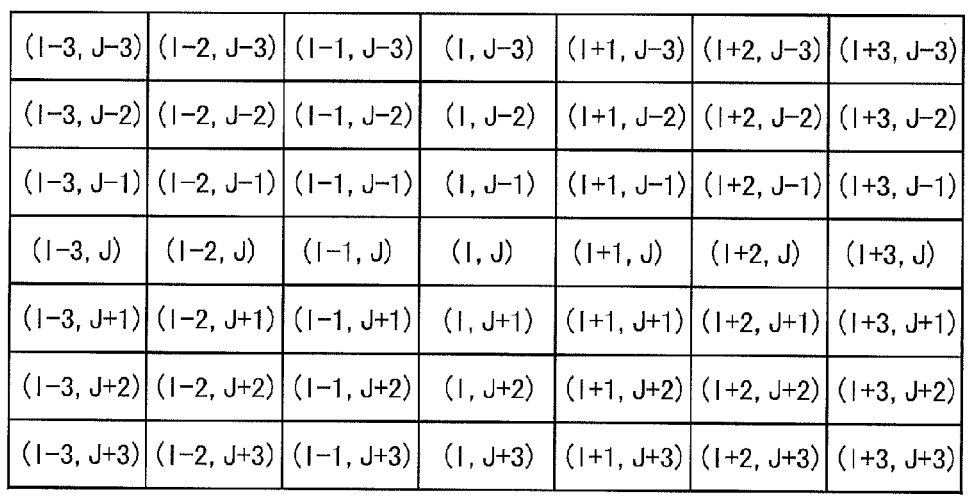
FIG. 11 is a diagram describing calculation of a post-correction luminance value for an area with global coordinates (I,J) in the first embodiment.

By the way, as for an area with global coordinates (I,J), when areas positioned within the range of global coordinates from (I−3,J−3) to (I+3,J+3) are respectively set as focus areas, post-correction luminance values are calculated by equation (6) above (see FIG. 11). Specifically, for each area, the post-correction luminance value is calculated more than once by equation (6). In calculating the post-correction luminance value, when calculating the first time, the first emission luminance of each area is used as Vlo(i,j) on the right-hand side of equation (6). In addition, a value for Vlb(i,j), which is the left-hand side of equation (6), obtained by the (n−1)'th calculation is used as Vlo(i,j) on the right-hand side of equation (6) for the n'th calculation. Moreover, for each area, a value of Vlb(i,j) obtained by the last calculation out of the plural calculations is set as a second emission luminance for that area.

Figure 12:
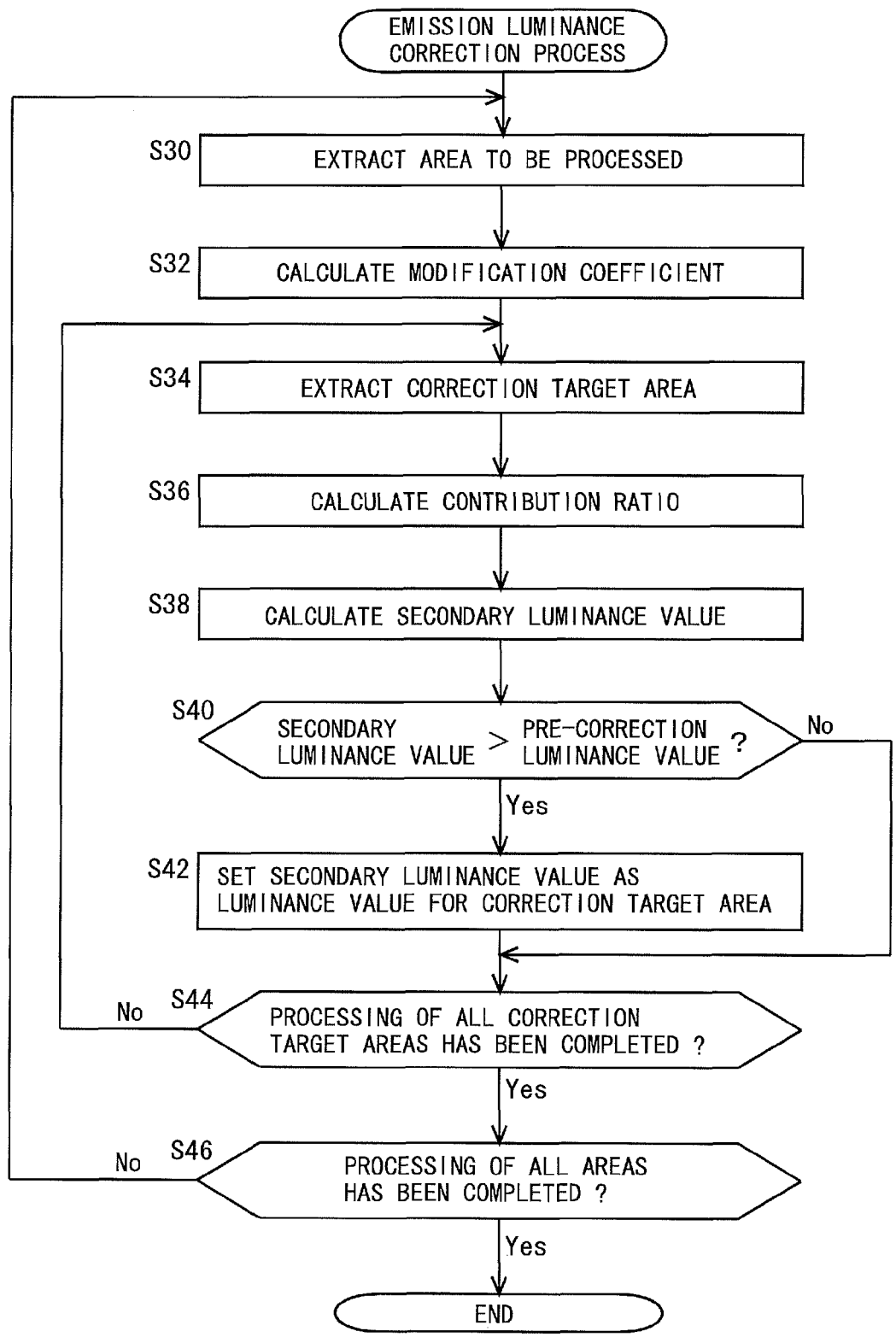
FIG. 12 is a flowchart illustrating an example procedure of an emission luminance correction process in the first embodiment.

FIG. 12 is a flowchart illustrating an example procedure of the emission luminance correction process. Initially, the emission luminance correction section 153 extracts an area to be processed (a focus area) from among all areas included within the panel (step S30). Note that the processing from step S30 to step S46 is repeated the same number of times as the number of areas included within the panel, and one area is extracted upon each occurrence of step S30. Then, the emission luminance correction section 153 calculates a horizontal modification coefficient and a vertical modification coefficient for the focus area by equations (3) and (4) above (step S32).

Next, the emission luminance correction section 153 extracts a correction target area to be corrected for its luminance value from among areas surrounding the focus area (step S34). Note that the processing from step S34 to step S44 is repeated the same number of times as the number of contribution ratio data items stored in the LED filter 156, and one area is extracted upon each occurrence of step S34.

Next, the emission luminance correction section 153 calculates the contribution ratio for the correction target area by equation (5) above (step S36). Then, the emission luminance correction section 153 calculates the product (hereinafter, referred to as the "secondary luminance value") of the first emission luminance of the focus area and the contribution ratio for the correction target area obtained in step S36 (step S38). Specifically, in step S38, the value of $E(i,J) \cdot Vlo(0,0)$ on the right-hand side of equation (6) is calculated.

Next, the emission luminance correction section 153 determines whether or not the secondary luminance value calculated in step S38 is greater than the current luminance value (pre-correction luminance value) for the correction target area (step S40). Specifically, in step S40, $Vlo(i,j)$ and $E(i,J) \cdot Vlo(0,0)$, which are both on the right-hand side of equation (6), are compared. When the result of the determination indicates that the secondary luminance value is greater than the pre-correction luminance value, the process advances to step S42, and if not, the process advances to step S44. In step S42, the emission luminance correction section 153 sets the secondary luminance value calculated in step S38 as a luminance value (post-correction luminance value) for the correction target area. Specifically, in step S42, the value for $E(i,J) \cdot Vlo(0,0)$ on the right-hand side of equation (6) is assigned to $Vlb(i,j)$ on the left-hand side of equation (6). After step S42, the process advances to step S44.

In step S44, the emission luminance correction section 153 determines whether or not extraction of all correction target areas corresponding to the focus area has been completed. When the result of the determination indicates that the extraction of all correction target areas has been completed, the process advances to step S46, and if not, the process returns to step S34. In step S46, the emission luminance correction section 153 determines whether or not extraction of all areas within the panel has been completed. When the result of the determination indicates that the extraction of all areas has been completed, the emission luminance correction process ends, and if not, the process returns to step S30.

<1.4 Action and Effect>

Next, the action and effect in the present embodiment will be described. Here, the LED filter 156 is assumed to be as shown in FIG. 7 with the first emission luminance of a certain area (to be set as a "focus area") being 255. In this case, if secondary luminance values for surrounding areas are calculated without considering the maximum luminance position in the focus area, the secondary luminance values for the areas are as shown in FIG. 13. Note that in FIG. 13, the focus area is denoted by character "64". The secondary luminance values for the areas in FIG. 13 are values obtained by multiplying contribution ratios stored in the LED filter 156 by 255, which is the first emission luminance of the focus area 64. As can be appreciated from FIG. 13, the secondary luminance values for the areas are symmetrical with respect to the focus area 64 both in the vertical and the horizontal direction.

On the other hand, in the present embodiment, the secondary luminance values for surrounding areas are calculated considering the maximum luminance position in the focus area. For example, in the case where $\delta x=8$, $Wx=10$, $\delta y=8$, and $Wy=10$ (see FIG. 6), with the adjustment coefficient T in equations (3) and (4) being set at 0.25, the horizontal modification coefficient $Rh(I,J)$ for the focus area (with global coordinates $(I,J)$) is calculated as shown in equation (7) below, and the vertical modification coefficient $Rv(I,J)$ for the focus area is calculated as shown in equation (8) below.

$$Rh(I, J) = T \cdot \delta x / Wx \quad (7)$$
$$= 0.25 \cdot 8 / 10$$
$$= 0.2$$

$$Rv(I, J) = T \cdot \delta y / Wy \quad (8)$$
$$= 0.25 \cdot 8 / 10$$
$$= 0.2$$

Contribution ratios $E(i,j)$ for areas, each of which is obtained by substituting the horizontal modification coefficient $Rh(I,J)$ obtained by equation (7) and the vertical modification coefficient $Rv(I,J)$ obtained by equation (8) into equation (5), are as shown in FIG. 14. Here, as for equation (5), the relationship between $E(i,j)$ and $C(i,j)$ is as follows.

Where $i>0$ and $j>0$, $$E(i,j)=(1+0.2) \cdot (1+0.2) \cdot C(i,j).$$

Where $i>0$ and $j=0$, $$E(i,j)=(1+0.2) \cdot (1+0.0) \cdot C(i,j).$$

Where $i=0$ and $j>0$, $$E(i,j)=(1+0.0) \cdot (1+0.2) \cdot C(i,j).$$

Where $i>0$ and $j<0$, $$E(i,j)=(1+0.2) \cdot (1-0.2) \cdot C(i,j).$$

Where $i<0$ and $j>0$, $$E(i,j)=(1-0.2) \cdot (1+0.2) \cdot C(i,j).$$

Where $i<0$ and $j=0$, $$E(i,j)=(1-0.2) \cdot (1+0.0) \cdot C(i,j).$$

Where $i=0$ and $j<0$, $$E(i,j)=(1+0.0) \cdot (1-0.2) \cdot C(i,j).$$

Where $i<0$ and $j<0$, $$E(i,j)=(1-0.2) \cdot (1-0.2) \cdot C(i,j).$$

As a result, the secondary luminance values for areas surrounding the focus area are as shown in FIG. 15. Note that in FIG. 15, the focus area is denoted by character "65". The secondary luminance values for the areas in FIG. 15 are values obtained by multiplying contribution ratios $E(i,j)$ calculated by equation (5) by 255, which is the first emission luminance of the focus area 65. As can be appreciated from FIG. 15, the secondary luminance values for areas positioned above and to the right of the focus area are relatively high, and the secondary luminance values for areas positioned below and to the left of the focus area are relatively low. Specifically, areas positioned in the same direction as the maximum luminance position from the center position of the focus area have relatively high secondary luminance values, and areas positioned in the opposite direction to the maximum luminance position from the center position of the focus area have relatively low secondary luminance values.

Figure 16:
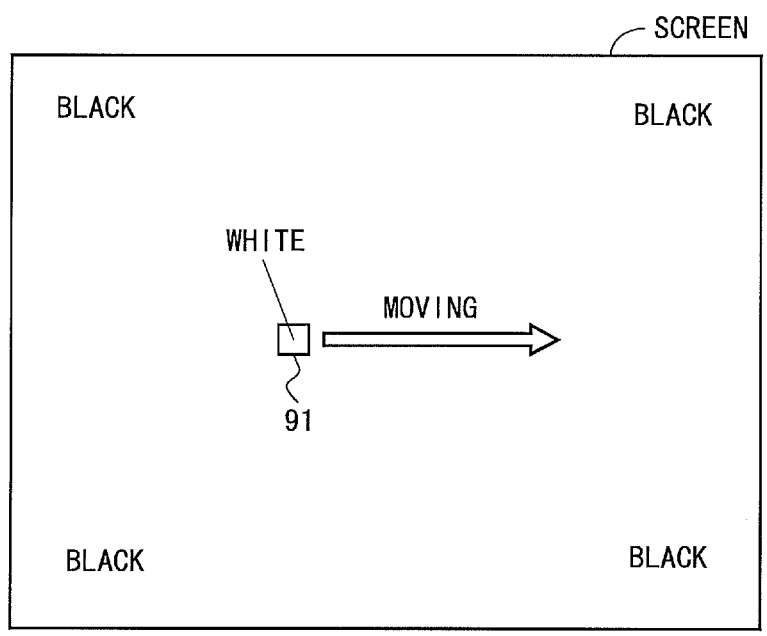
FIG. 16 is a diagram describing an effect of the first embodiment.
Figure 17:
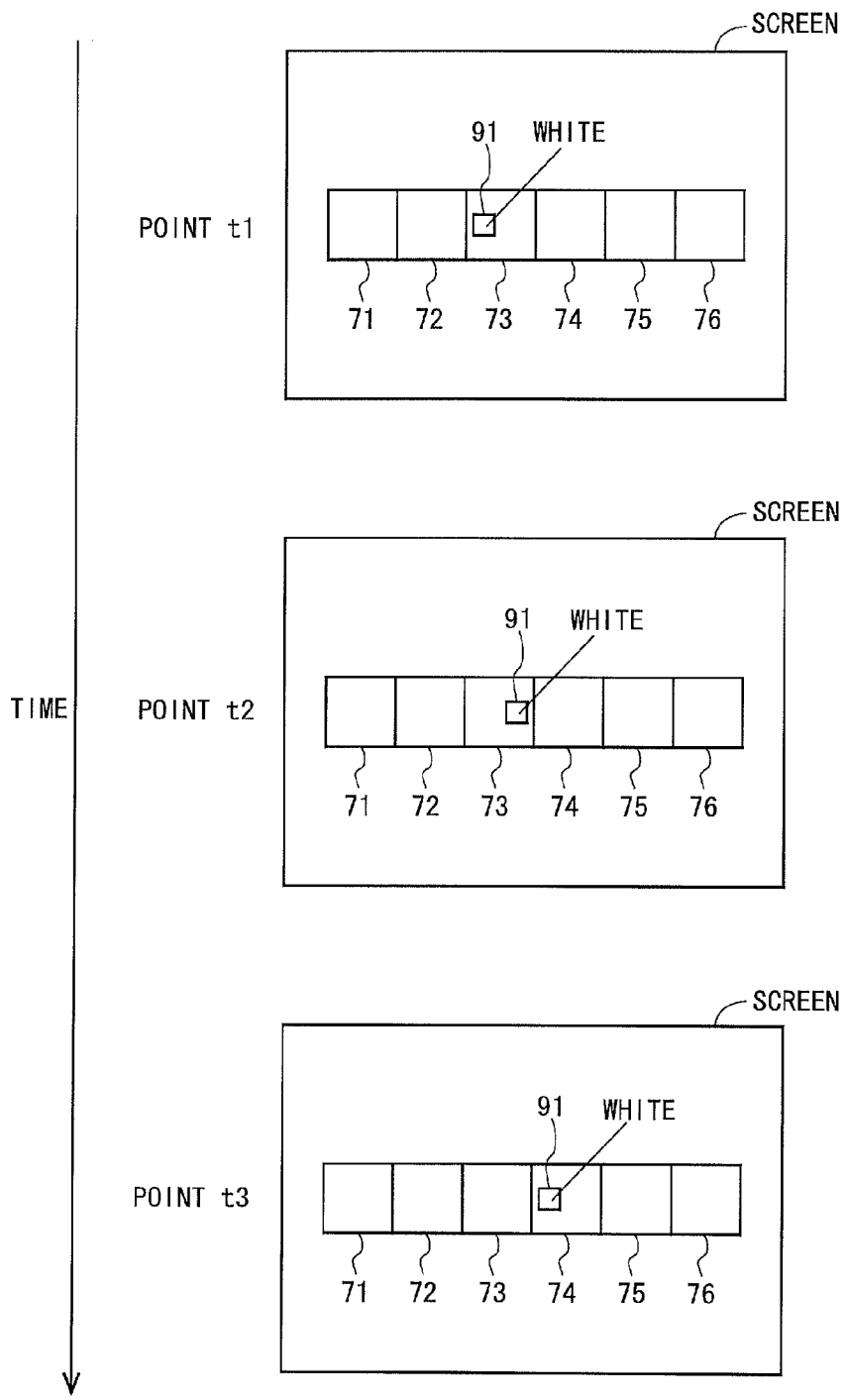
FIG. 17 is a diagram describing the effect of the first embodiment.
Figure 18:
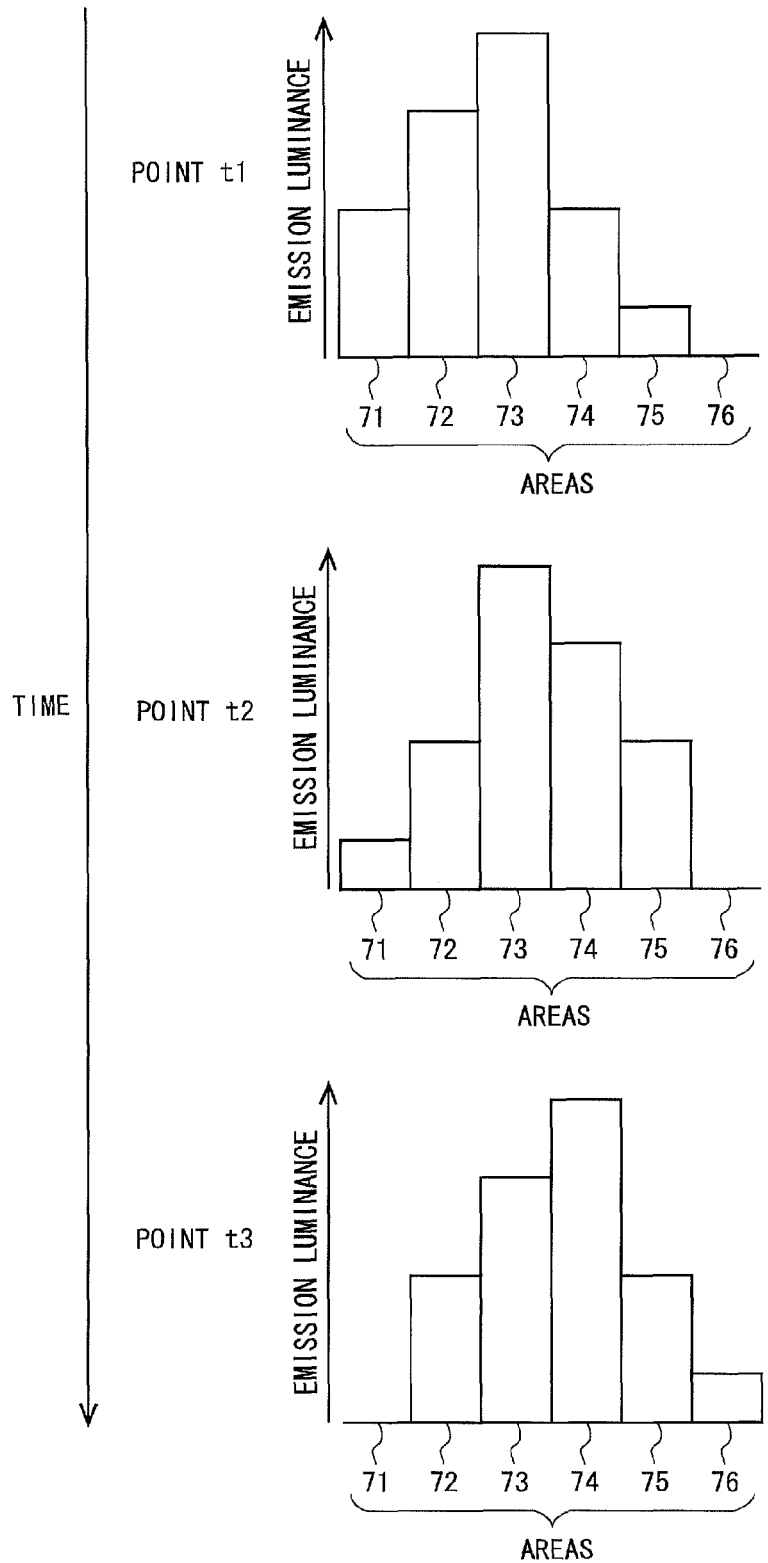
FIG. 18 is a diagram describing the effect of the first embodiment.

By determining the secondary luminance values for areas surrounding a focus area in accordance with the maximum luminance position in the focus area in a manner as described above, occurrence of flickering is suppressed when displaying dynamic images. This will be described with reference to FIGS. 16 to 18. Here, a description will be given regarding a phenomenon which might occur when dynamic images are displayed with a small white (100% luminance) rectangular object 91 moving from left to right on a black (0% luminance) background on the screen, as shown in FIG. 16. Concretely, it is assumed that the rectangular object 91 moves within horizontally continuous areas 71 to 76 (see FIG. 17) from left to right on the screen over time. In the case where the rectangular object 91 moves from area 73 to area 74 in a period from point t1 to point t3, as shown in FIG. 17, emission luminances (of LEDs) in areas 71 to 76 change as shown in FIG. 18 in the present embodiment. Although the rectangular object 91 lies within area 73 both at point t1 and point t2, emission luminances of areas 71, 72, 74, and 75 differ between point t1 and point t2. Specifically, at point t1 where the rectangular object 91 lies relatively on the left side within area 73, area 73 has the maximum emission luminance with areas 71 and 72 having relatively high emission luminances and areas 74 and 75 having relatively low emission luminances. On the other hand, at point $t_2$ where the rectangular object 91 lies relatively on the right side within area 73, area 73 has the maximum emission luminance with areas 71 and 72 having relatively low emission luminances and areas 74 and 75 having relatively high emission luminances. In addition, at point t3 immediately after the rectangular object 91 moving from area 73 to area 74, area 74 has the maximum emission luminance with areas 72 and 73 having relatively high emission luminances and areas 75 and 76 having relatively low emission luminances.

Figure 25:
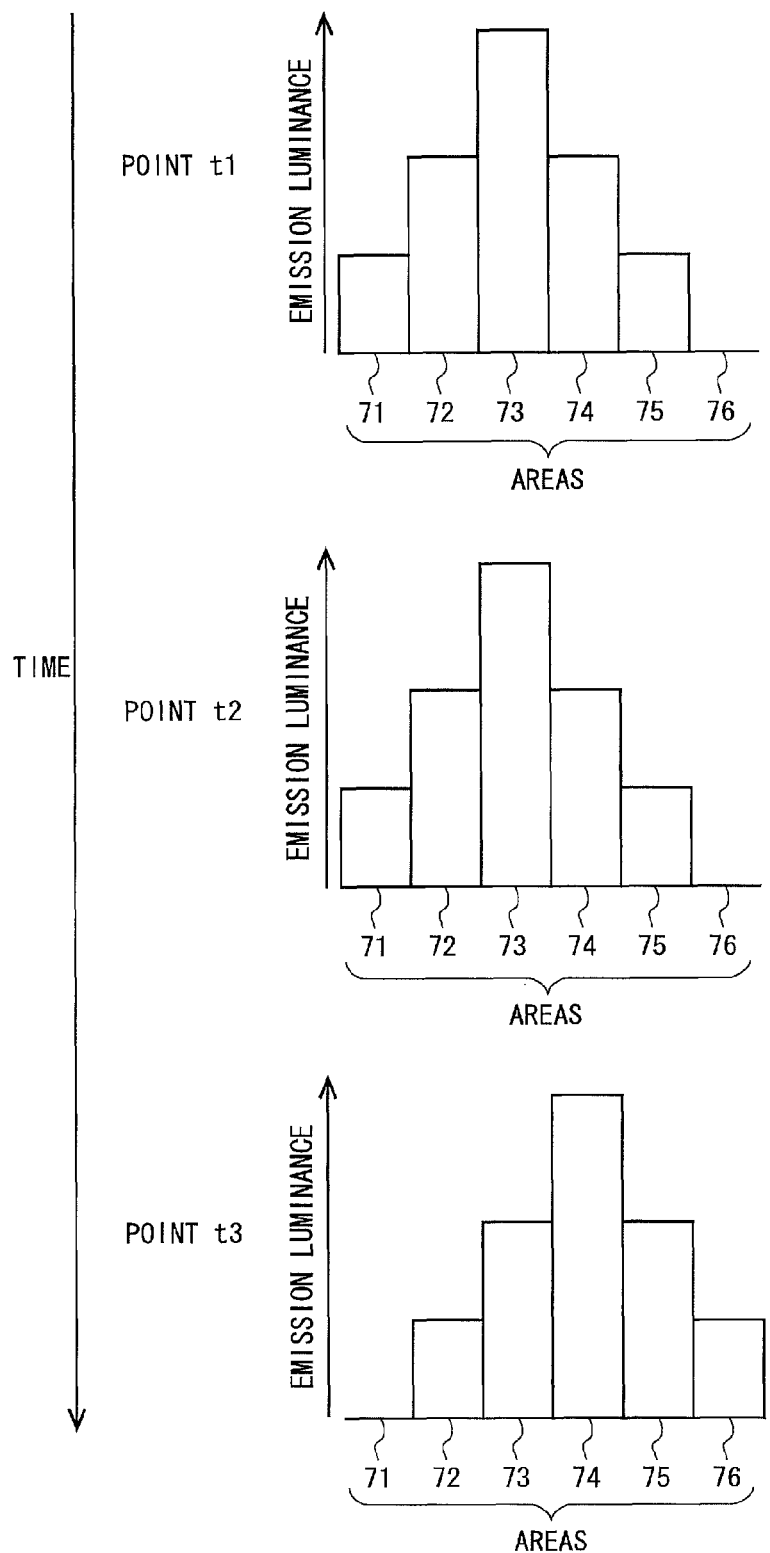
FIG. 25 is a diagram describing a problem with the conventional art.

In this manner, it can be recognized that, unlike in the conventional art (see FIG. 25), the emission luminance of each area gradually changes as the rectangular object 91 moves. In addition, looking at area 74, its emission luminance greatly changes in a period from point t2 to point t3 in the conventional art (see FIG. 25). On the other hand, in the present embodiment, the emission luminance is already raised at point t2, and therefore does not greatly change in the period from point t2 to point t3.

As described above, in the present embodiment, the emission luminance of each area does not greatly change upon the rectangular object 91 moving across the boarder of areas. Thus, it is possible to suppress occurrence of flickering that is caused when displaying dynamic images due to the emission luminance of each area being determined on the basis of a maximum or mean value of pixel luminances within that area.

<1.5 Variant>

In the first embodiment, the configuration is such that "when the secondary luminance value is greater than the pre-correction luminance value, the secondary luminance value is set as a luminance value for the correction target area" in steps S40 and S42 of FIG. 12, but the present invention is not limited to this. The configuration may be such that "the sum of the pre-correction luminance value and the secondary luminance value may be set as a luminance value for the correction target area" after step S38 of FIG. 12. Specifically, the post-correction luminance value Vlb(i,j) for the area with local coordinates (i,j) may be calculated by equation (9) below, in place of equation (6).

$$Vlb(i,j)=Vlo(i,j)+E(i,j)\cdot Vlo(0,0) \quad (9)$$

In this configuration, as for the area with global coordinates (I,J), its post-correction luminance value is calculated by equation (9) when areas positioned within the range of global coordinates from (I−3,J−3) to (I+3,J+3) are respectively set as focus areas (see FIG. 11). Specifically, as for each area, the post-correction luminance value is calculated more than once on the basis of equation (9). In calculating the post-correction luminance value, when calculating the first time, the first emission luminance of each area is used as Vlo(i,j) on the right-hand side of equation (9). In addition, a value for Vlb(i, j), which is the left-hand side of equation (9), obtained by the (n−1)'th calculation is used as Vlo(i,j) on the right-hand side of equation (9) for the n'th calculation. Accordingly, as for each area, a value which is obtained after a plurality of addition processes based on equation (9) to the first emission luminance is used as the second emission luminance for that area. However, the emission luminance has an upper limit, and therefore when the value for Vlb(i,j) obtained by equation (9) exceeds the upper limit, the second emission luminance is set at the upper limit.

<2. Second Embodiment>
<2.1 Configuration and Operation>

Next, a second embodiment of the present invention will be described. The overall configuration and the overview of operation are the same as in the first embodiment (see FIGS. 2 to 5), and therefore any descriptions thereof will be omitted. As in the first embodiment, the area-active drive processing section 15 is configured as shown in FIG. 1. However, the operation of the maximum luminance position eccentricity coefficient calculation section 152 and the details of the emission luminance correction process performed by the emission luminance correction section 153 differ from the first embodiment, and therefore their descriptions will be given below.

Figure 19:
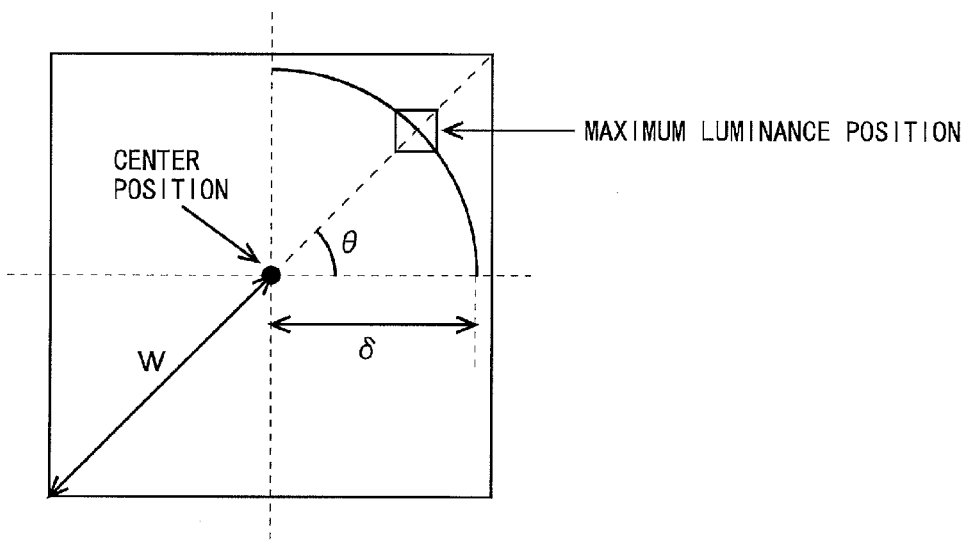
FIG. 19 is a diagram describing calculation of a maximum luminance position eccentricity coefficient in the second embodiment.

The maximum luminance position eccentricity coefficient calculation section 152 obtains a maximum luminance position eccentricity coefficient for each area on the basis of the maximum luminance position. Here, referring to FIG. 19, how the maximum luminance position eccentricity coefficient is obtained in the present embodiment will be described. As for an area shown in FIG. 19, the length of a diagonal line is 2W. Accordingly, the distance from the center position of the area to each vertex of the area is W. Moreover, in the area shown in FIG. 19, the maximum luminance position is at a distance of δ from the center position, and an angle between a straight line extending from the center position to the maximum luminance position and a horizontal axis extending in a positive direction from the center position is θ. In this case, the horizontal eccentricity coefficient Kh is calculated by equation (10) below, and the vertical eccentricity coefficient Kv is calculated by equation (11) below.

$$Kh=\cos\theta\cdot\delta/W \quad (10)$$

$$Kv=\sin\theta\cdot\delta/W \quad (11)$$

Note that as for the sign of an angle of a general trigonometric function, cos θ in equation (10) takes a positive value when the maximum luminance position is at the right of the center position and cos θ in equation (10) takes a negative value when the maximum luminance position is at the left of the center position. In addition, sin θ in equation (11) takes a positive value when the maximum luminance position is above the center position and sin θ in equation (11) takes a negative value when the maximum luminance position is below the center position.

Figure 20:
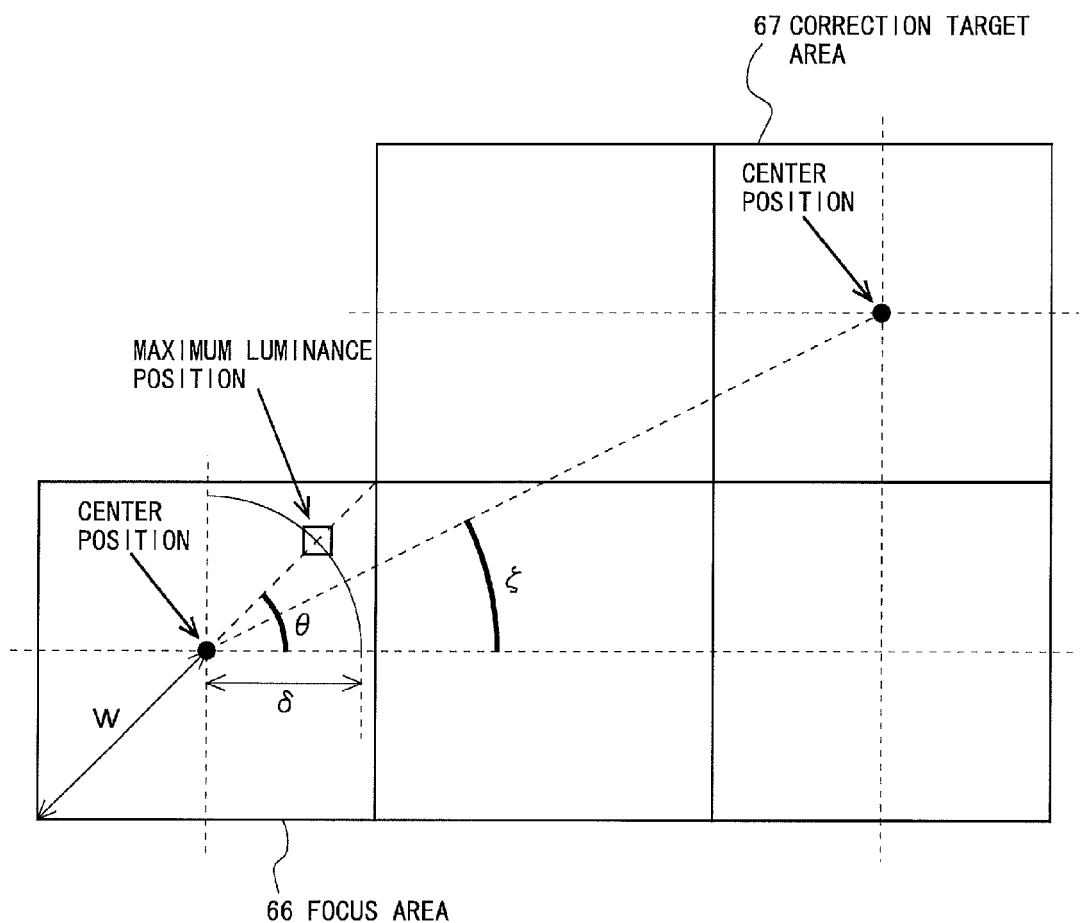
FIG. 20 is a diagram describing an emission luminance correction process in the second embodiment.

Next, the emission luminance correction process in the present embodiment will be described with reference to FIG. 20. Here, it is assumed that an area denoted by character "66" is a focus area, and an area two areas away in the horizontal direction (rightward) and one area away in the vertical direction (upward) from the focus area 66 is a correction target area 67.

The emission luminance correction section 153 initially obtains modification coefficients (a horizontal modification coefficient and a vertical modification coefficient) for adjusting a post-correction luminance value, using a maximum luminance position eccentricity coefficient calculated by the maximum luminance position eccentricity coefficient calculation section 152. Note that in the first embodiment, one modification coefficient is obtained for each focus area, but in the present embodiment, the number of modification coefficients obtained for each focus area is equal to the number of areas which are to be correction target areas. Specifically, during processing of one focus area, a modification coefficient is calculated upon each extraction of any area as a correction target area.

When the focus area 66 has global coordinates (I,J), and the correction target area 67 has local coordinates (i,j), the horizontal modification coefficient Rh(I,J) is calculated by equation (12) below.

$$Rh(I, J) = T \cdot Kh \cdot \cos\zeta \qquad (12)$$
$$= T \cdot \cos\theta \cdot \delta/W \cdot \cos\zeta$$

Likewise, when the focus area 66 has global coordinates (I,J), and the correction target area 67 has local coordinates (i,j), the vertical modification coefficient Rv(I,J) is calculated by equation (13) below.

$$Rv(I, J) = T \cdot Kv \cdot \sin\zeta \qquad (13)$$
$$= T \cdot \sin\theta \cdot \delta/W \cdot \sin\zeta$$

In equations (12) and (13), T is an adjustment coefficient determined for each device to adjust the magnitudes of the modification coefficients. In addition, $\zeta$ is an angle between a straight line extending from the center position of the focus area 66 to the center position of the correction target area 67 and a horizontal axis extending in a positive direction from the center position of the focus area 66. Note that as in the case of the first embodiment, the configuration may be such that different adjustment coefficients are used in equations (12) and (13).

Figure 21:
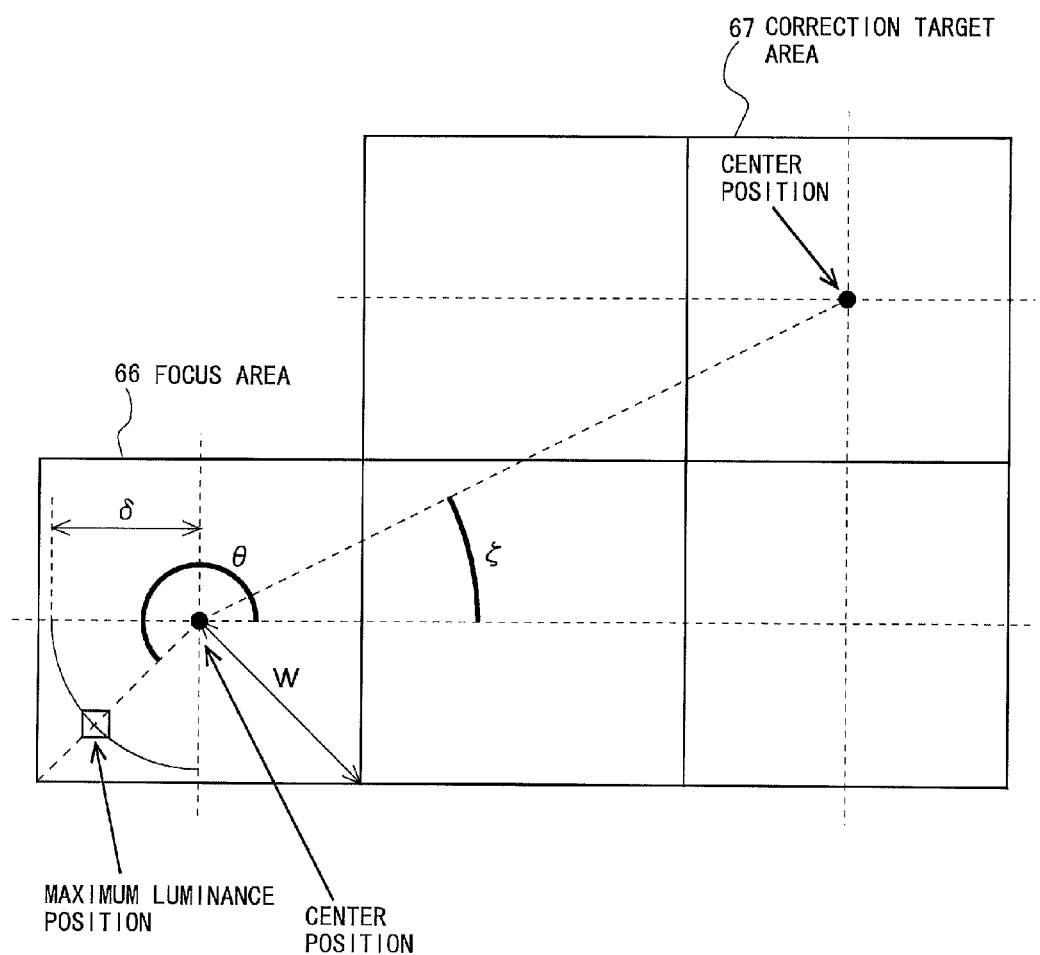
FIG. 21 is a diagram describing the emission luminance correction process in the second embodiment.

As can be appreciated from equation (12), when both $\cos\theta$ and $\cos\zeta$ take positive values or when both $\cos\theta$ and $\cos\zeta$ take negative values, i.e., when the maximum luminance position (in the focus area 66) and the center position of the correction target area 67 are on the same side with respect to a vertical axis passing through the center position of the focus area 66, the horizontal modification coefficient Rh(I,J) takes a positive value. When one of $\cos\theta$ and $\cos\zeta$ takes a positive value and the other takes a negative value, i.e., when the maximum luminance position (in the focus area 66) and the center position of the correction target area 67 are on opposite sides with respect to a vertical axis passing through the center position of the focus area 66 (see FIG. 21), the horizontal modification coefficient Rh(I,J) takes a negative value.

Furthermore, as can be appreciated from equation (13), when both $\sin\theta$ and $\sin\zeta$ take positive values or when both $\sin\theta$ and $\sin\zeta$ take negative values, i.e., when the maximum luminance position (in the focus area 66) and the center position of the correction target area 67 are on the same side with respect to a horizontal axis passing through the center position of the focus area 66, the vertical modification coefficient Rv(I,J) takes a positive value. When one of $\sin\theta$ and $\sin\zeta$ takes a positive value and the other takes a negative value, i.e., when the maximum luminance position (in the focus area 66) and the center position of the correction target area 67 are on opposite sides with respect to a horizontal axis passing through the center position of the focus area 66 (see FIG. 21), the vertical modification coefficient Rv(I,J) takes a negative value.

Next, the contribution ratio for each area stored in the LED filter 156 is corrected on the basis of the horizontal modification coefficient Rh(I,J) and the vertical modification coefficient Rv(I,J) for the focus area 66 with its local coordinates at (0,0). Concretely, a post-correction contribution ratio E(i,j) for an area (correction target area 67) with local coordinates (i,j) is calculated by equation (14) below.

$$E(i,j) = (1+Rh(I,J)) \cdot (1+Rv(I,J)) \cdot C(i,j) \qquad (14)$$

Here, C(i,j) is a pre-correction contribution ratio for the area with local coordinates (i,j), which is stored in the LED filter 156.

By the way, as for equations (10) to (14), $\cos\theta$, $\cos\zeta$, $\sin\theta$, and $\sin\zeta$ take values between −1 and 1, and $\delta/W$ takes a value between 0 and 1. Accordingly, the maximum luminance position eccentricity coefficient takes a value between −1 and 1. Therefore, the modification coefficients (the horizontal modification coefficient and the vertical modification coefficient) obtained by equations (12) and (13) take values between −T and T. Thus, the contribution ratio E(i,j) obtained by equation (14) takes a value within the range from "$(1-T)^2 \cdot C(i,j)$" to "$(1+T)^2 \cdot C(i,j)$".

Next, using the contribution ratio E(i,j), post-correction luminance values Vlb(i,j) for areas surrounding the focus area 66 are obtained. As for this, as in the first embodiment, the post-correction luminance values Vlb(i,j) are calculated by equation (6). In addition, as in the first embodiment, as for each area, a post-correction luminance value is calculated more than once on the basis of equation (6). Moreover, for each area, a value of Vlb(i,j) obtained by the last calculation out of the plural calculations is set as a second emission luminance for that area. Note that as in the first embodiment, the luminance value Vlb(i,j) may be calculated by equation (9), in place of equation (6).

Figure 22:
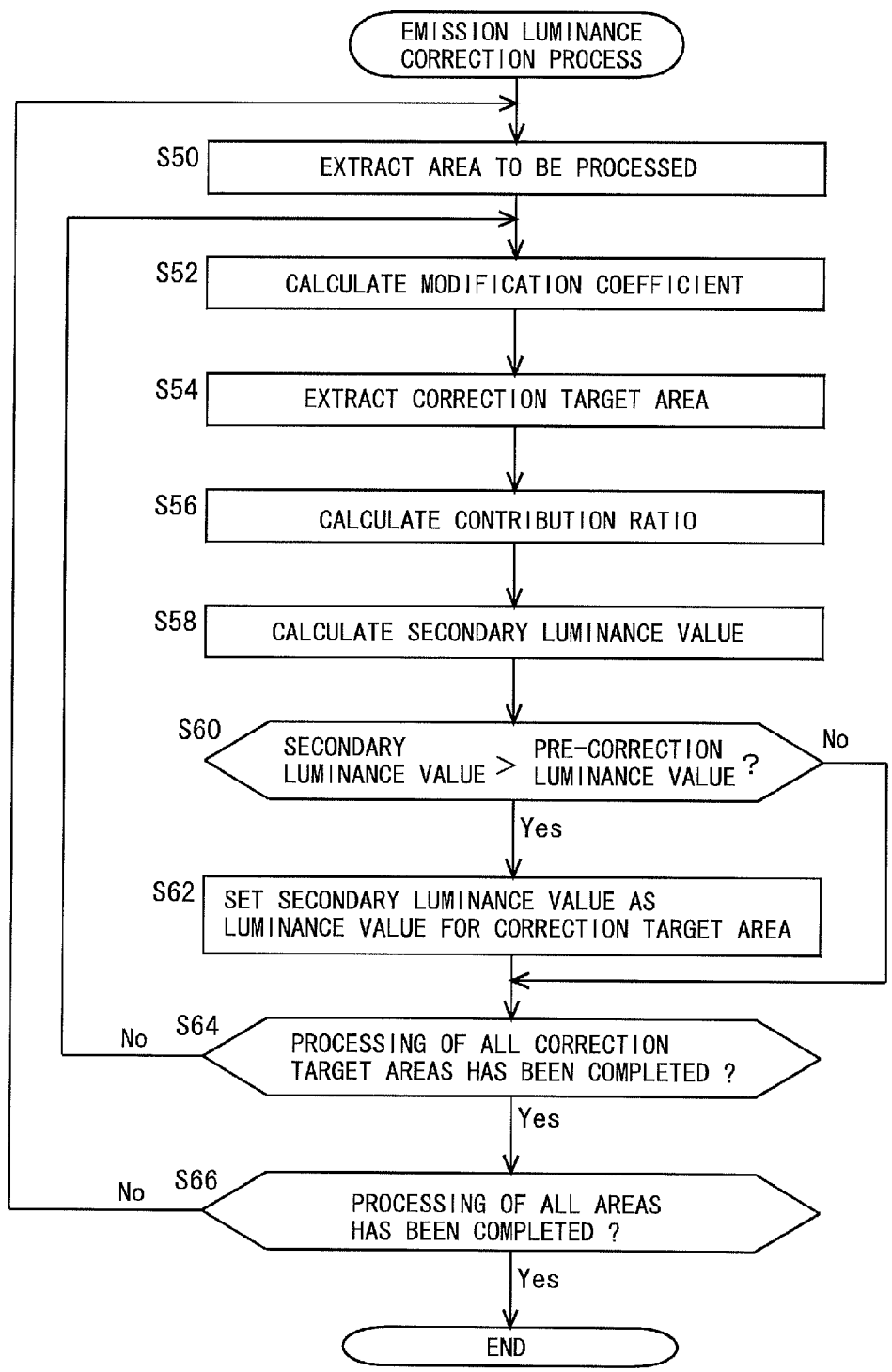
FIG. 22 is a flowchart illustrating the procedure of the emission luminance correction process in the second embodiment.

FIG. 22 is a flowchart illustrating the procedure of the emission luminance correction process in the present embodiment. Initially, the emission luminance correction section 153 extracts an area to be processed (a focus area) from among all areas included within the panel (step S50). Note that the processing from step S50 to step S66 is repeated the same number of times as the number of areas included within the panel, and one area is extracted upon each occurrence of step S50.

Next, the emission luminance correction section 153 extracts a correction target area to be corrected for its luminance value from among areas surrounding the focus area (step S52). Note that the processing from step S52 to step S64 is repeated the same number of times as the number of contribution ratio data items stored in the LED filter 156, and one area is extracted upon each occurrence of step S52.

Next, the emission luminance correction section 153 calculates a horizontal modification coefficient and a vertical modification coefficient for the focus area by equations (12) and (13) above (step S54). Then, the emission luminance correction section 153 calculates a contribution ratio for the correction target area by equation (14) above (step S56). Thereafter, the emission luminance correction section 153 calculates the product (secondary luminance value) of the first emission luminance for the focus area and the contribution ratio for the correction target area obtained in step S56

(step S58). Specifically, in step S58, the value for E(i,J)·Vlo (0,0) on the right-hand side of equation (6) is calculated.

Next, the emission luminance correction section 153 determines whether or not the secondary luminance value calculated in step S58 is greater than the current luminance value (pre-correction luminance value) for the correction target area (step S60). Specifically, in step S60, Vlo(i,j) and E(i,J)·Vlo(0,0), which are both on the right-hand side of equation (6), are compared. When the result of the determination indicates that the secondary luminance value is greater than the pre-correction luminance value, the process advances to step S62, and if not, the process advances to step S64. In step S62, the emission luminance correction section 153 sets the secondary luminance value calculated in step S58 as a luminance value for the correction target area. Specifically, in step S62, the value for E(i,J)·Vlo(0,0) on the right-hand side of equation (6) is assigned to Vlb(i,j) on the left-hand side of equation (6). After step S62, the process advances to step S64.

In step S64, the emission luminance correction section 153 determines whether or not extraction of all correction target areas corresponding to the focus area has been completed. When the result of the determination indicates that the extraction of all correction target areas has been completed, the process advances to step S66, and if not, the process returns to step S52. In step S66, the emission luminance correction section 153 determines whether or not extraction of all areas within the panel has been completed. When the result of the determination indicates that the extraction of all areas has been completed, the emission luminance correction process ends, and if not, the process returns to step S50.

<2.2 Action and Effect>

Next, the action and effect in the present embodiment will be described. Here, the LED filter 156 is assumed to be as shown in FIG. 7 with the first emission luminance of a certain area (to be set as a "focus area") being 255. For example, in the case where δ=8, W=10, and θ=45° (see FIG. 19), with the adjustment coefficient T in equations (12) and (13) being set at 0.25, the horizontal modification coefficient Rh(I,J) for the focus area is calculated as shown in equation (15) below, and the vertical modification coefficient Rv(I,J) for the focus area is calculated as shown in equation (16) below.

$$Rh(I, J) = T * \cos\theta * \frac{\delta}{W} * \cos\zeta \qquad (15)$$
$$= 0.25 * \frac{1}{\sqrt{2}} * \frac{8}{10} * \cos\zeta$$
$$= \frac{\sqrt{2}}{10} * \cos\zeta$$

$$Rv(I, J) = T * \sin\theta * \frac{\delta}{W} * \sin\zeta \qquad (16)$$
$$= 0.25 * \frac{1}{\sqrt{2}} * \frac{8}{10} * \sin\zeta$$
$$= \frac{\sqrt{2}}{10} * \sin\zeta$$

In equations (15) and (16), ζ is an angle between a straight line extending from the center position of the focus area to the center position of the correction target area and a horizontal axis extending in a positive direction from the center position of the focus area.

Contribution ratios E(i,j) for areas, which are obtained by substituting the horizontal modification coefficient Rh(I,J) obtained by equation (15) and the vertical modification coefficient Rv(I,J) obtained by equation (16) into equation (14), are as shown in FIG. 23. Accordingly, secondary luminance values for areas surrounding the focus area are as shown in FIG. 24. Note that in FIG. 24, the focus area is denoted by character "68". The secondary luminance values for the areas in FIG. 24 are values obtained by multiplying the contribution ratios E(i,j) calculated by equation (14) by 255, which is the first emission luminance of the focus area 68. As in the first embodiment, as for areas positioned in the same direction as the maximum luminance position with respect to the center position of the focus area, the secondary luminance values are relatively high, and as for areas positioned in the opposite direction to the maximum luminance position with respect to the center position of the focus area, the secondary luminance values are relatively low. Thus, as in the first embodiment, it is possible to suppress occurrence of flickering that is caused when displaying dynamic images due to the emission luminance of each area being determined on the basis of a maximum or mean value of pixel luminances within that area.

By the way, ζ takes a different value in accordance with the center position of the correction target area. In addition, θ takes a different value in accordance with the maximum luminance position within the focus area. Both ζ and θ take values between 0 and 2π. Here, looking at equation (12) for calculating the horizontal modification coefficient Rh(I,J), the product of cos θ and cos ζ is included in the right-hand side. Therefore, when the maximum luminance position and the center position of the correction target area are on the same side with respect to a vertical axis passing through the center position of the focus area, the horizontal modification coefficient Rh(I,J) takes a positive value, and when the maximum luminance position and the center position of the correction target area are on opposite sides, the horizontal modification coefficient Rh(I,J) takes a negative value. In addition, looking at equation (13) for calculating the vertical modification coefficient Rv(I,J), the product of sin θ and sin ζ is included in the right-hand side. Therefore, when the maximum luminance position and the center position of the correction target area are on the same side with respect to a horizontal axis passing through the center position of the focus area, the vertical modification coefficient Rv(I,J) takes a positive value, and when the maximum luminance position and the center position of the correction target area are on opposite sides, the vertical modification coefficient Rv(I,J) takes a negative value. Moreover, on the basis of the horizontal modification coefficient Rh(I,J) and the vertical modification coefficient Rv(I,J), the contribution ratio E(i,j) for each area is obtained.

In this manner, in the present embodiment, contribution ratios E(i,j) for areas surrounding the focus area are obtained on the basis of a positional relationship that takes an angle between the focus area and the correction target area into consideration and a positional relationship that takes an angle between the maximum luminance position and the center position in the focus area into consideration. Thus, when compared to the first embodiment, emission luminances of areas surrounding each area can be enhanced with higher accuracy in accordance with the degree of deviation of the maximum luminance position from the center position in that area.

Note that when calculating the modification coefficients by equations (12) and (13), for example, the distance between the center position of the focus area and the center position of the correction target area may be taken into consideration. As a result, the emission luminance of each area can be determined with even higher accuracy.

<3. Other>

The above embodiments have been described taking a liquid crystal display device as an example, but the present invention is not limited to this. By performing the aforementioned emission luminance correction process in any image display device with a backlight, an effect similar to that achieved in the case of the liquid crystal display device can be achieved.

| DESCRIPTION OF THE REFERENCE CHARACTERS | |
|---|---|
| 10 | liquid crystal display device |
| 11 | liquid crystal panel |
| 12 | panel driver circuit |
| 13 | backlight |
| 14 | backlight driver circuit |
| 15 | area-active drive processing section |
| 21 | display element |
| 31 | input image |
| 32 | first emission luminance |
| 33 | maximum luminance position eccentricity coefficient |
| 34 | contribution ratio |
| 35 | LED data (second emission luminance) |
| 36 | light spread data |
| 37 | display luminance |
| 38 | liquid crystal data |
| 151 | emission luminance calculation section |
| 152 | maximum luminance position eccentricity coefficient calculation section |
| 153 | emission luminance correction section |
| 154 | display luminance calculation section |
| 155 | liquid crystal data calculation section |
| 156 | LED filter |
| 157 | luminance spread filter |

The invention claimed is:

1. An image display device having a function of controlling a backlight luminance, the device comprising:
a display panel including a plurality of display elements;
a backlight including a plurality of light sources;
an emission luminance calculation section for dividing an input image into a plurality of areas and obtaining luminances upon emission of light sources corresponding to each area as first emission luminances on the basis of a portion of the input image of a corresponding area;
an emission luminance correction section for obtaining second emission luminances of the plurality of areas by correcting the first emission luminances of any areas positioned within predetermined ranges from each area on the basis of a maximum luminance position for the corresponding area, the maximum luminance position being a position of a pixel having a maximum luminance value based on the input image;
a display data calculation section for obtaining display data for controlling light transmittances of the display elements, on the basis of the input image and the second emission luminances;
a panel driver circuit for outputting signals for controlling the light transmittances of the display elements to the display panel, on the basis of the display data; and
a backlight driver circuit for outputting signals for controlling luminances of the light sources to the backlight, on the basis of the second emission luminances, wherein,
when assuming that post-correction values for the first emission luminances based on predetermined correction data are defined as reference luminances, the emission luminance correction section obtains the second emission luminances in such a way that the second emission luminances are higher than respective reference luminances as for areas positioned on the same side as the maximum luminance position within each area with respect to the center position of the area, and the second emission luminances are lower than respective reference luminances as for areas positioned on an opposite side to the maximum luminance position within each area with respect to the center position of the area.

2. The image display device according to claim 1, further comprising an eccentricity value calculation section for obtaining an eccentricity value indicating a positional relationship between the center position and the maximum luminance position for each area, wherein the emission luminance correction section obtains the second emission luminances on the basis of the eccentricity value.

3. The image display device according to claim 2, wherein the eccentricity value calculation section obtains the eccentricity value for each area on the basis of the distance from a vertical axis passing through the center position of the area to the maximum luminance position and the distance from a horizontal axis passing through the center position of the area to the maximum luminance position.

4. The image display device according to claim 2, wherein the eccentricity value calculation section obtains the eccentricity value for each area on the basis of the distance from the center position of the area to the maximum luminance position and the angle between a straight line extending from the center position of the area to the maximum luminance position and a horizontal axis passing through the center position of the area in a positive direction from the center position.

5. The image display device according to claim 1, wherein,
the emission luminance correction section sequentially sets the plurality of areas one by one as a focus area, and sequentially sets areas positioned within predetermined ranges from the focus area one by one as a correction target area, and corrects the luminance of the correction target area, thereby performing luminance correction more than once per area when obtaining the second emission luminances from the first emission luminances,
when performing the luminance correction once for each area, the emission luminance correction section obtains a second coefficient, on the basis of a first coefficient previously set as the correction data in accordance with a positional relationship between the focus area and the correction target area and also on the basis of the eccentricity value for the focus area, and sets a post-correction luminance of the correction target area, the post-correction luminance being either a luminance obtained by multiplying the first emission luminance of the focus area by the second coefficient or a pre-correction luminance of the correction target areas and being the greater of the two,
when performing a first luminance correction for each area, the emission luminance correction section sets the first emission luminance of the area as the pre-correction luminance, and
the emission luminance correction section sets the post-correction luminance obtained by the last luminance correction for each area as the second emission luminance.

6. The image display device according to claim 5, wherein the emission luminance correction section obtains the second emission luminances of the plurality of areas such that the second emission luminance of the correction target area is higher than the first emission luminance of the correction target area when the first emission luminance of the focus area is not 0.

7. The image display device according to claim 1, wherein, the emission luminance correction section sequentially sets the plurality of areas one by one as a focus area, and sequentially sets areas positioned within predetermined ranges from the focus area one by one as a correction target area, and corrects the luminance of the correction target area, thereby performing luminance correction more than once per area when obtaining the second emission luminances from the first emission luminances, when performing the luminance correction once for each area, the emission luminance correction section obtains a second coefficient, on the basis of a first coefficient previously set as the correction data in accordance with a positional relationship between the focus area and the correction target area and also on the basis of the eccentricity value for the focus area, and sets a post-correction luminance of the correction target area, the post-correction luminance being obtained by adding a luminance obtained by multiplying the first emission luminance of the focus area by the second coefficient to the pre-correction luminance of the correction target area, when performing a first luminance correction for each area, the emission luminance correction section sets the first emission luminance of the area as the pre-correction luminance, and the emission luminance correction section sets the post-correction luminance obtained by the last luminance correction for each area as the second emission luminance.

8. An image display method in an image display device provided with a display panel including a plurality of display elements and a backlight including a plurality of light sources, the method comprising:
   an emission luminance calculation step for dividing an input image into a plurality of areas and obtaining luminances upon emission of light sources corresponding to each area as first emission luminances on the basis of a portion of the input image of a corresponding area;
   an emission luminance correction step for obtaining second emission luminances of the plurality of areas by correcting the first emission luminances of any areas positioned within predetermined ranges from each area on the basis of a maximum luminance position for the corresponding area, the maximum luminance position being a position of a pixel having a maximum luminance value based on the input image;
   a display data calculation step for obtaining display data for controlling light transmittances of the display elements, on the basis of the input image and the second emission luminances;
   a panel drive step for outputting signals for controlling the light transmittances of the display elements to the display panel, on the basis of the display data; and
   a backlight drive step for outputting signals for controlling luminances of the light sources to the backlight, on the basis of the second emission luminances, wherein,
   when assuming that post-correction values for the first emission luminances based on predetermined correction data are defined as reference luminances, in the emission luminance correction step, the second emission luminances are obtained in such a way that the second emission luminances are higher than respective reference luminances as for areas positioned on the same side as the maximum luminance position within each area with respect to the center position of the area, and the second emission luminances are lower than respective reference luminances as for areas positioned on an opposite side to the maximum luminance position within each area with respect to the center position of the area.

9. The image display method according to claim 8, further comprising an eccentricity value calculation step for obtaining an eccentricity value indicating a positional relationship between the center position and the maximum luminance position for each area, wherein in the emission luminance correction step, the second emission luminances are obtained on the basis of the eccentricity value.

10. The image display method according to claim 9, wherein in the eccentricity value calculation step, the eccentricity value for each area is obtained on the basis of the distance from a vertical axis passing through the center position of the area to the maximum luminance position and the distance from a horizontal axis passing through the center position of the area to the maximum luminance position.

11. The image display method according to claim 9, wherein in the eccentricity value calculation step, the eccentricity value for each area is obtained on the basis of the distance from the center position of the area to the maximum luminance position and the angle between a straight line extending from the center position of the area to the maximum luminance position and a horizontal axis passing through the center position of the area in a positive direction from the center position.

12. The image display method according to claim 8, wherein,
   in the emission luminance correction step, the plurality of areas are sequentially set one by one as a focus area, and areas positioned within predetermined ranges from the focus area are sequentially set one by one as a correction target area and the luminance of the correction target area is corrected, thereby performing luminance correction more than once per area when obtaining the second emission luminances from the first emission luminances,
   when performing the luminance correction once for each area, in the emission luminance correction step, a second coefficient is obtained on the basis of a first coefficient previously set as the correction data in accordance with a positional relationship between the focus area and the correction target area and also on the basis of the eccentricity value for the focus area, and a post-correction luminance of the correction target area is set, the post-correction luminance being either a luminance obtained by multiplying the first emission luminance of the focus area by the second coefficient or a pre-correction luminance of the correction target area and being the greater of the two,
   when performing a first luminance correction for each area, in the emission luminance correction step, the first emission luminance of the area is set as the pre-correction luminance, and
   in the emission luminance correction step, the post-correction luminance obtained by the last luminance correction for each area is set as the second emission luminance.

13. The image display method according to claim 12, wherein in the emission luminance correction step, the second emission luminances of the plurality of areas are obtained such that the second emission luminance of the correction target area is higher than the first emission luminance of the correction target area when the first emission luminance of the focus area is not 0.

14. The image display method according to claim 8, wherein,
   in the emission luminance correction step, the plurality of areas are sequentially set one by one as a focus area, and areas positioned within predetermined ranges from the focus area are sequentially set one by one as a correction target area and the luminance of the correction target area is corrected, thereby performing luminance correction more than once per area when obtaining the second emission luminances from the first emission luminances, when performing the luminance correction once for each area, in the emission luminance correction step, a second coefficient is obtained on the basis of a first coefficient previously set as the correction data in accordance with a positional relationship between the focus area and the correction target area and also on the basis of the eccentricity value for the focus area, and a post-correction luminance of the correction target area is set, the post-correction luminance being obtained by adding a luminance obtained by multiplying the first emission luminance of the focus area by the second coefficient to the pre-correction luminance of the correction target area, when performing a first luminance correction for each area, in the emission luminance correction step, the first emission luminance of the area is set as the pre-correction luminance, and in the emission luminance correction step, the post-correction luminance obtained by the last luminance correction for each area is set as the second emission luminance.

* * * * *